(12) United States Patent
Nishikawa et al.

(10) Patent No.: US 6,829,201 B2
(45) Date of Patent: Dec. 7, 2004

(54) MAGNETIC INFORMATION RECORDING MEDIUM HAVING REGIONS MAGNETIZED IN DIFFERENT DIRECTIONS, A METHOD FOR RECORDING AND REPRODUCING FOR THE SAME, AND A METHOD OF MANUFACTURING THE SAME

(75) Inventors: Masakazu Nishikawa, Kanagawa (JP); Kazuyuki Usuki, Kanagawa (JP); Yoshihisa Usami, Kanagawa (JP); Makoto Nagao, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 404 days.

(21) Appl. No.: 10/023,832

(22) Filed: Dec. 21, 2001

(65) Prior Publication Data

US 2002/0081461 A1 Jun. 27, 2002

(30) Foreign Application Priority Data

| Dec. 22, 2000 | (JP) | 2000-391341 |
| Dec. 22, 2000 | (JP) | 2000-391342 |
| Dec. 22, 2000 | (JP) | 2000-391343 |
| Dec. 22, 2000 | (JP) | 2000-391344 |
| May 29, 2001 | (JP) | 2001-161371 |
| Sep. 10, 2001 | (JP) | 2001-274234 |
| Sep. 10, 2001 | (JP) | 2001-274235 |
| Sep. 10, 2001 | (JP) | 2001-274236 |

(51) Int. Cl.$^7$ .......................................... G11B 11/00
(52) U.S. Cl. ........................................... 369/13.38
(58) Field of Search ........................ 369/13.38, 13.39, 369/13.36, 13.35, 13.55, 14; 360/59; 428/69.3, 694 ML

(56) References Cited

U.S. PATENT DOCUMENTS

| 5,932,364 A | * | 8/1999 | Hirokane et al. | 369/13.53 |
| 6,396,773 B1 | * | 5/2002 | Kuo | 369/13.02 |
| 6,490,111 B1 | * | 12/2002 | Sacks | 360/53 |

* cited by examiner

*Primary Examiner*—Tan Dinh
(74) *Attorney, Agent, or Firm*—Sughrue Mion, PLLC

(57) ABSTRACT

There are provided an information recording medium which permits accurate tracking servo, and a method for recording and reproducing for an information recording medium which allows recording and reproducing of a signal at a favorable S/N by carrying out at least one of information recording and information reproduction while accurately performing tracking servo. A magneto-optic disk includes a magnetic recording layer for magnetically recording information. The magnetic recording layer is in advance magnetized for concentrically or spirally around the center of the disk in such a manner that magnetized regions are disposed such that adjacent regions are magnetized in different directions and alternately arranged in the radial direction of the disk. Accordingly, tracking can be continuously performed and accurate tracking servo can also be performed.

39 Claims, 15 Drawing Sheets

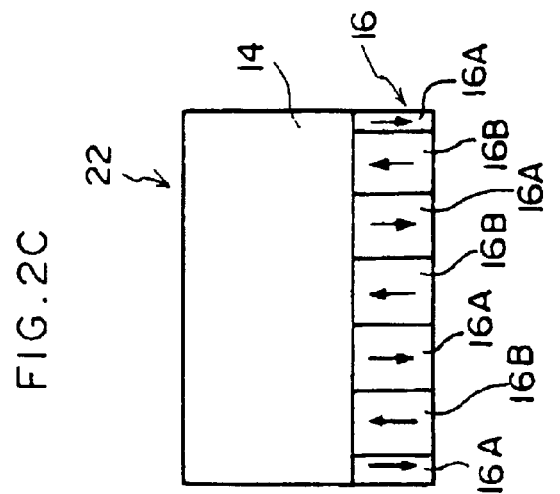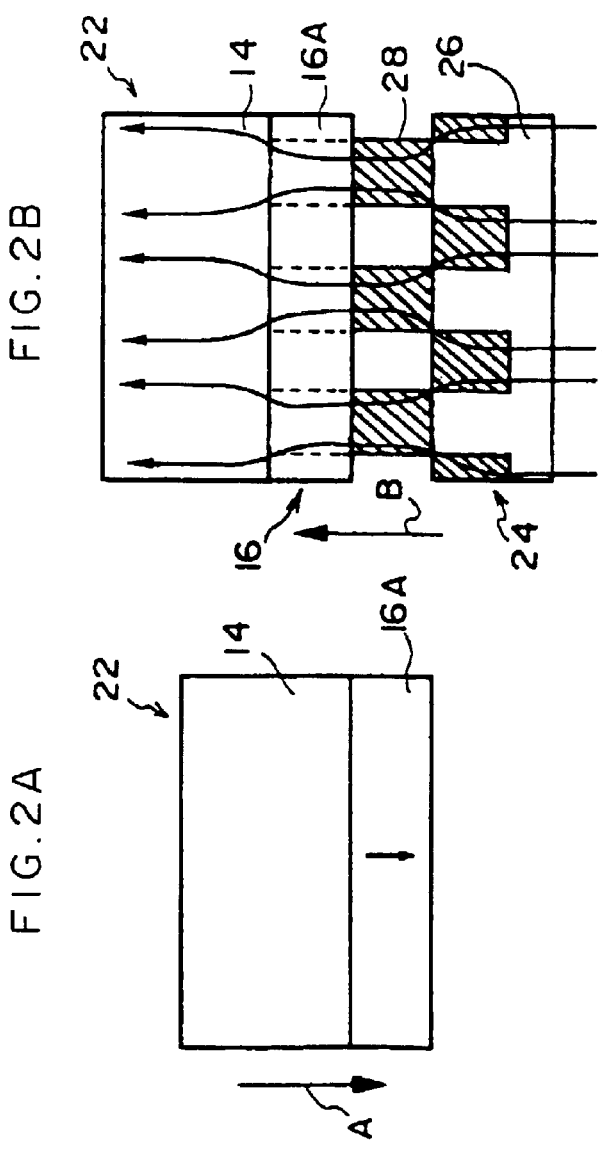

DIRECTION TOWARD THE PLANE OF POLARIZATION OF LIGHT

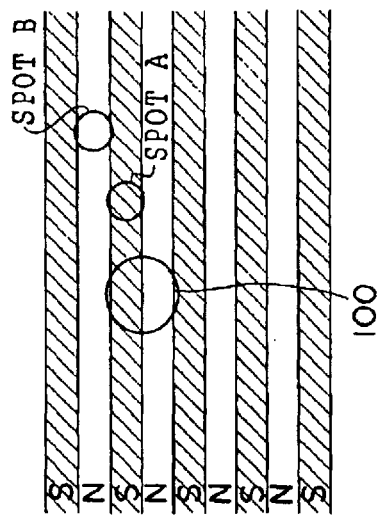
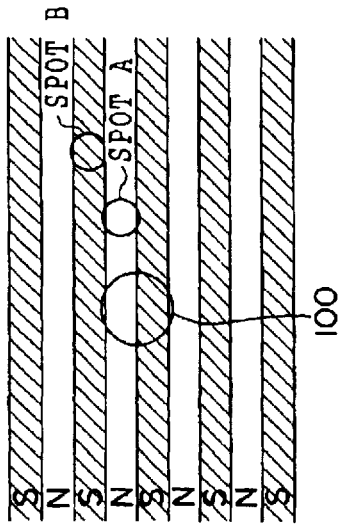
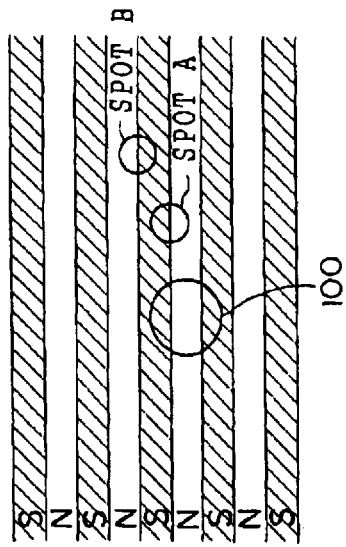
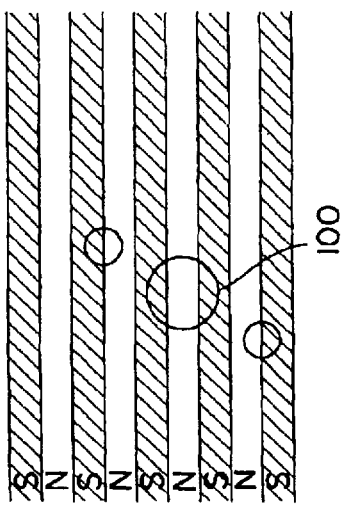
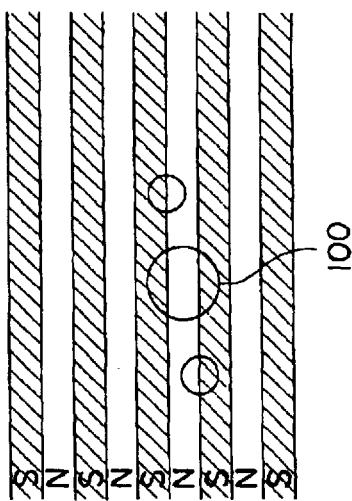

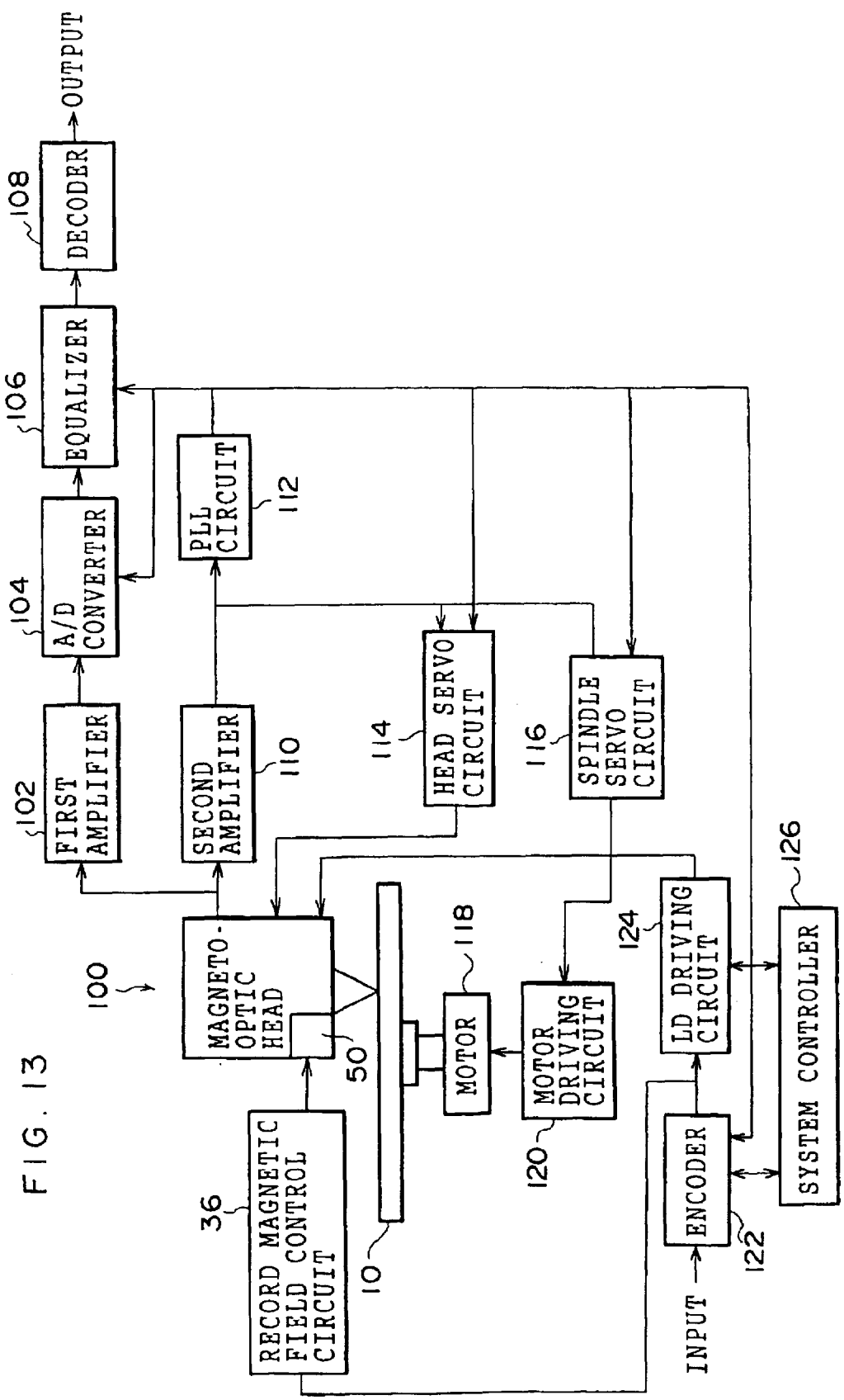

MAGNETIC INFORMATION RECORDING MEDIUM HAVING REGIONS MAGNETIZED IN DIFFERENT DIRECTIONS, A METHOD FOR RECORDING AND REPRODUCING FOR THE SAME, AND A METHOD OF MANUFACTURING THE SAME

BACKGROUND OF THE INVENTION

1. Field of the Invention

The present invention relates to an information recording medium and a method for recording and reproducing the same, and particularly to an information recording medium on which tracking servo information is magnetically preformat-recorded, and a method for recording and reproducing for an information recording medium in which at least one of recording and reproduction of information is carried out while reading servo information using the information recording medium and performing tracking. The present invention also relates to an information recording method in which information is recorded on the image recording medium by a magneto-optic system utilizing near field light. Further, the present invention relates to a manufacturing method of an information recording medium, and particularly to a manufacturing method of an information recording medium on which tracking servo information is magnetically preformat-recorded.

2. Description of the Related Art

With a rapid increase in the amount of information to be handled by a personal computer, large-capacity and low-cost information recording media which permit reduction of access time have been developed one after another. Examples of such large capacity information recording media include a built-in magnetic recording medium such as a hard disk, and a removable magnetic recording medium such as a Zip disk developed by Iomega Corp.(in U.S.). The hard disk or Zip disk realizes large capacity recording by reducing the width of each track to increase a track density. In order that a narrow track be accurately scanned by a magnetic head and a recording signal be reproduced at a favorable signal to noise ratio (S/N), tracking servo technique in which the position of a magnetic head is corrected by detecting relative displacement of the magnetic head and the track, performs an important function.

In the hard disk or Zip disk, a tracking servo signal, an address information signal, a reproduction clock signal and the like are in advance recorded (preformat-recorded) with high positional accuracy at the time of manufacturing magnetic recording media. A region in which these signals are recorded, that is, a servo region is disposed discretely to the surface of a disk, and a magnetic head accurately scans a track while confirming and correcting the position of the head by reproducing these signals.

As a next-generation high density recording system, a recording system utilizing near field light (a near-field light recording system) is considered to be effective. In this recording system, it is expected that high density recording of 100 gigabits/inch$^2$ or more becomes possible.

Near field light is non-propagation light which is generated when light scatters and diffracts in a micro-aperture having a diameter which is the wavelength or less, and is localized in the vicinity of the micro-aperture (that is, in a region from a light emission end of the micro-aperture to the wavelength of the light). Further, near field light can also be generated by condensing light in a solid immersion lens (SIL). Due to light recording using the near field light, a recording mark smaller than a recording mark obtained by normal light recording can be formed, thereby resulting in a remarked increase in the surface recording density of information.

The near field light exists only in a region from a light emission end of the micro-aperture or SIL, which is a recording head, to the wavelength of light. Therefore, recording and reproducing needs to be carried out in such a manner that means for generating near field light and a detector (head) of the light are disposed extremely in the vicinity of the recording medium (specifically, in a region apart from the recording medium by a distance of several tens nm or less).

However, accompanied with a further increase in the recording density, the track width is becoming narrower. In a conventional servo system, there exists a problem in that accurate scanning of tracks by a magnetic head (servo following) is not permitted. There is a high possibility that a problem may arise in servo following, particularly in the recording density of 100 gigabits/inch$^2$ or more. Further, if a trial to reliably perform servo following is made by increasing the ratio of a servo region to the area of a disk, a recording region is reduced and a large recording capacity is difficult to maintain.

Further, in an optical disk, a servo system is employed wherein tracking is performed by using a tracking guide having a land/groove structure in which tracks are provided concentrically or spirally in the disk. However, this system has a problem in that large unevenness exists on the disk surface. Accordingly, in the next-generation high density recording system in which a detector needs to be disposed extremely in the vicinity of a recording medium, it is difficult to realize a stable running or flying state of the head.

Moreover, exact positioning accuracy is required by preformat-recording. Therefore, conventionally, a magnetic recording medium is built in a drive, and thereafter, recording is carried out by a magnetic head which is exactly position-controlled by using a servo recording device dedicated thereto.

However, the amount of signals to be preformat-recorded increases accompanied with the increase in magnetic recording density. Therefore, there exists a problem in that a lot of time is required for preformat-recording, which leads to deterioration of production efficiency.

Further, there has also been proposed a method in which a magnetic-transfer master carrier with a predetermined magnetization pattern being formed thereon by a magnetic layer, is used and the predetermined magnetization pattern is transferred to a slave medium to allow preformat-recording. However, in the conventional transfer method, it was necessary to use a magnetic-transfer master carrier having coercive force (HC) which is at least three times the coercive force of the slave medium such that the magnetization pattern of the magnetic-transfer master carrier should not be demagnetized even if it is excited by an external magnetic field. When a flat magnetic body is partially magnetized, the antimagnetic force of a magnetic body used in a magnetic recording medium for high density recording is a high value, that is, 2000 Oe or thereabouts, and the coercive force of the magnetic-transfer master carrier is 6000 Oe or more. Accordingly, a certain magnetic material can only be used for the magnetic-transfer master carrier, and it was virtually difficult to form a minute magnetic pattern.

SUMMARY OF THE INVENTION

The present invention has been achieved in view of the problems of the above-described prior art, and an object thereof is to provide an information recording medium which permits accurate tracking servo, particularly, an information recording medium which allows stable running of the head even when a detector is disposed extremely in the vicinity of the recording medium. Another object of the present invention is to provide a method for recording and reproducing for an information recording medium, in which recording (high density recording) and reproducing of signals can be carried out at a favorable S/N by carrying out at least one of recording and reproducing of information while accurately performing tracking servo.

Further, still another object of the present invention is to provide a manufacturing method of an information recording medium, in which an information recording medium which permits accurate tracking servo can be manufactured precisely in a short time.

In order to achieve the above-described objects of the present invention, there are provided a 1st to a 39th aspects.

A 1st aspect of the present invention is an information recording medium comprising a substrate disposed thereon a magnetic recording layer for magnetically recording information, wherein the magnetic recording layer is in advance magnetized concentrically or spirally around a center of a disk for tracking and is disposed in such a manner that magnetized regions magnetized in different directions are alternately arranged in a radial direction of the disk.

A 2nd aspect of the present invention is an information recording medium according to the 1st aspect, wherein the directions in which the magnetized regions are magnetized for tracking are perpendicular to a surface of the disk.

A 3rd aspect of the present invention is an information recording medium according to the 1st aspect, wherein the substrate is disk-shaped, flexible and nonmagnetic.

A 4th aspect of the present invention is an information recording medium according to the 1st aspect, wherein discrete servo fields are in advance magnetically recorded in the magnetic recording layer.

A 5th aspect of the present invention is an information recording medium according to the 1st aspect, wherein the magnetized regions are each formed so as to meander at a fixed frequency.

A 6th aspect of the present invention is an information recording medium according to the 1st aspect, wherein a magnetized region magnetized in a predetermined direction is wider than a magnetized region magnetized in a direction which is different from the predetermined direction.

A 7th aspect of the present invention is a method for recording and reproducing for an information recording medium, in which the information recording medium comprising a substrate disposed thereon a magnetic recording layer for magnetically recording information, the magnetic recording layer being in advance magnetized concentrically or spirally around a center of a disk for tracking and being disposed in such a manner that magnetized regions magnetized in different directions are alternately arranged in a radial direction of the disk, is used, comprising:

at least one of recording and reproducing information, while performing tracking based on a difference in the directions in which the magnetized regions of the magnetic recording layer are magnetized.

A 8th aspect of the present invention is a method for recording and reproducing for an information recording medium according to the 7th aspect, wherein the magnetized regions are irradiated with linearly polarized light, a direction in which the plane of polarization of reflected light rotates corresponding to the difference in the directions in which the magnetized regions are magnetized is detected, and the tracking is preformed based on the detected direction in which the plane of polarization of the reflected light rotates.

A 9th aspect of the present invention is a method for recording and reproducing for an information recording medium according to the 8th aspect, wherein the linearly polarized light is near field light.

A 10th aspect of the present invention is a method for recording and reproducing for an information recording medium according to the 7th aspect, wherein the tracking is performed by using a three-beam method in which directions in which the planes of polarization of reflected lights of two tracking beams rotate are detected respectively and the two detected values are compared.

A 11th aspect of the present invention is a method for recording and reproducing for an information recording medium, in which the information recording medium comprising a substrate disposed thereon a magnetic recording layer for magnetically recording information, the magnetic recording layer being in advance magnetized concentrically or spirally around a center of a disk for tracking and being disposed in such a manner that magnetized regions magnetized in different directions are alternately arranged in a radial direction of the disk, and discrete servo fields being in advance magnetically recorded in the magnetic recording layer, is used, comprising:

at least one of recording and reproducing information, while performing tracking based on a difference in the directions in which the magnetized regions of the magnetic recording layer are magnetized; and performing sector servo based on the discretely recorded servo fields.

A 12th aspect of the present invention is a method for recording and reproducing for an information recording medium, in which the information recording medium comprising a substrate disposed thereon a magnetic recording layer for magnetically recording information, the magnetic recording layer being in advance magnetized concentrically or spirally around a center of a disk for tracking and being disposed in such a manner that magnetized regions magnetized in different directions are alternately arranged in a radial direction of the disk, and the magnetized regions being each formed so as to meander at a fixed frequency, is used, comprising:

at least one of recording and reproducing information, while performing tracking based on a difference in the directions in which the magnetized regions of the magnetic recording layer are magnetized; and generating at least one of a clock signal and an address signal based on the frequency at which the magnetized regions meander.

A 13th aspect of the present invention is a method for recording and reproducing for an information recording medium according to the 7th aspect, wherein information is recorded in the magnetized regions.

A 14th aspect of the present invention is a method for recording and reproducing for an information recording medium according to the 7th aspect, wherein information is recorded in the magnetized regions by using one of a light modulation system or a magnetic modulation system.

A 15th aspect of the present invention is a method for recording and reproducing for an information recording medium according to the 7th aspect, wherein information is magnetically recorded in such a manner in which the magnetized regions of the magnetic recording layer are irradiated with near field light and a portion irradiated with the near field light is heated to a substantial Curie temperature, and a magnetic field having a predetermined direction thereof is applied to the portion from a magnetic head.

A 16th aspect of the present invention is a method for recording and reproducing for an information recording medium according to the 7th aspect, wherein information is magnetically recorded only in magnetized region magnetized in a predetermined direction.

A 17th aspect of the present invention is a method for recording and reproducing for an information recording medium according to the 16th aspect, wherein the magnetized region magnetized in the predetermined direction is wider than a magnetized region magnetized in a direction which is different from the predetermined direction.

A 18th aspect of the present invention is a method for recording and reproducing for an information recording medium according to the 16th aspect, wherein the magnetized region magnetized in the predetermined direction is divided into a plurality of tracks and information is recorded thereon.

A 19th aspect of the present invention is a method for recording and reproducing for an information recording medium according to the 10th aspect, wherein the magnetized regions are irradiated with linearly polarized light, a direction in which the plane of polarization of reflected light rotates corresponding to the difference in the directions in which the magnetized regions are magnetized is detected, and information recorded in the magnetized regions is read based on the detected direction in which the plane of polarization of the reflected light rotates.

A 20th aspect of the present invention is a method for recording and reproducing for an information recording medium according to the 7th aspect, wherein electric current is made generate due to magnetism of the magnetized regions by electromagnetic induction, a direction in which the electric current flows corresponding to the difference in the directions in which the magnetized regions are magnetized is detected, and information recorded in the magnetized regions is reproduced based on the detected direction in which the electric current flows.

A 21st aspect of the present invention is a method for recording and reproducing for an information recording medium according to the 7th aspect, wherein electrical resistance is made to change due to magnetism of the magnetized regions, and a changed amount of the electrical resistance is detected, and information recorded in the magnetized region is reproduced based on the detected changed amount of the electrical resistance,.

A 22nd aspect of the present invention is a method for recording and reproducing for an information recording medium according to the 7th aspect, wherein at least one of recording and reproducing of information is carried out in such a manner that the surface of the magnetic recording layer and the magnetic head are made close to each other with a distance therebetween of no greater than 100 nm on a disk-surface average.

A 23rd aspect of the present invention is an information recording medium according to the 1st aspect, wherein the substrate is disk-shaped and smooth.

A 24th aspect of the present invention is an information recording medium according to the 23rd aspect, wherein a direction of magnetization for tracking and a direction of magnetization for recording and reproducing information are each made perpendicular to the surface of the disk.

A 25th aspect of the present invention is an information recording medium according to the 23rd aspect, wherein a protective layer is formed on the magnetic recording layer.

A 26th aspect of the present invention is an information recording medium according to the 25th aspect, wherein a lubricating film is formed on the protective layer.

A 27th aspect of the present invention is an information recording medium according to the 26th aspect, wherein a total thickness of the protective layer and the lubricating film is no greater than 100 nm.

A 28th aspect of the present invention is an information recording medium according to the 23rd aspect, wherein a reflective film is formed between the substrate and the magnetic recording layer.

A 29th aspect of the present invention is an information recording medium according to the 23rd aspect, wherein the substrate is a flexible and non-magnetic base plate.

A 30th aspect of the present invention is a method for recording and reproducing for an information recording medium according to the 7th aspect, wherein information is magnetically recorded in such a manner in which the magnetized regions of the magnetic recording layer are irradiated with near field light and a portion irradiated with the near field light is heated to a substantially Curie temperature, and a magnetic field having a predetermined direction thereof is applied to the portion from a magnetic head.

A 31st aspect of the present invention is a method for recording and reproducing for an information recording medium according to the 7th aspect, wherein the predetermined direction of the magnetic field is perpendicular to the surface of the disk.

A 32nd aspect of the present invention is a method for recording and reproducing for an information recording medium according to the 30th aspect, wherein information is recorded in the magnetic recording layer by applying the magnetic field having the predetermined direction thereof, from a side of the magnetic recording layer opposite to the base plate.

A 33rd aspect of the present invention is a method for recording and reproducing for an information recording medium according to the 30th aspect, wherein, with the magnetic field having the predetermined direction thereof being applied from the magnetic head to the magnetized regions of the magnetic recording layer, the near field light modulated in accordance with a recording signal is applied to the magnetized regions to thereby allow magnetic recording of information.

A 34th aspect of the present invention is a method for recording and reproducing for an information recording medium according to the 30th aspect, wherein, with near field light being applied to the magnetized regions of the magnetic recording layer, the magnetic field having the predetermined direction thereof, which is modulated in accordance with a recording signal, is applied to the magnetized regions from the magnetic head to thereby allow magnetic recording of information.

A 35th aspect of the present invention is a method for recording and reproducing for an information recording medium according to the 30th aspect, wherein the base plate is flexible and non-magnetic.

A 36th aspect of the present invention is a method for recording and reproducing for an information recording medium according to the 30th aspect, wherein information is recorded in such a manner that the surface of the magnetic recording layer and the magnetic head are moved close to each other with a distance therebetween of no greater than 100 nm.

A 37th aspect of the present invention is a method for recording and reproducing for an information recording medium according to the 30th aspect, wherein the tracking is performed in such a manner that a reflective film is formed between the base plate and the magnetic recording layer, and light reflected by the surface of the magnetic recording layer when near field light is applied to the information recording medium and light transmitted through the magnetic recording layer and reflected by the reflective film are detected.

A 38th aspect of the present invention is a method for recording and reproducing for an information recording medium according to the 30th aspect, wherein information is recorded by dividing a magnetized region magnetized in the predetermined direction into a plurality of tracks.

A 39th aspect of the present invention is a method of manufacturing an information recording medium, the information recording medium comprising a magnetic recording layer for magnetically recording information, the magnetic recording layer being in advance magnetized concentrically or spirally around the center of a disk for tracking such that magnetized regions magnetized in different directions are alternately arranged in a radial direction of the disk, the method comprising the steps of:

magnetizing the entire magnetic recording layer in a predetermined direction;

adhering a magnetic layer of a disk-shaped master carrier to a surface of the magnetic recording layer of the information recording medium, the master carrier being formed concentrically or spirally around a center of the disk and having an unevenness pattern in which at least convex portions are covered by the magnetic layer; and applying a magnetic field having a direction thereof which is different from the predetermined direction, to the magnetic recording layer via the magnetic layer to thereby reverse a magnetized direction of a portion of the magnetic recording layer to which the magnetic layer adheres.

According to the first aspect of the present invention, the information recording medium has, on the substrate (support), the magnetic recording layer for magnetically recording information. The magnetic recording layer is in advance magnetized for tracking such that magnetized regions magnetized in different directions are alternately arranged in the radial direction of the disk. Therefore, tracking can be performed based on the difference in the directions in which magnetized regions are magnetized. Further, the magnetic recording layer is in advance magnetized concentrically or spirally around the center of the disk for tracking, and tracking can be continuously performed and accurate tracking servo can be performed. Moreover, tracking can be performed based on the difference in the directions in which the magnetized regions are magnetized, and it is not necessary to form unevenness on the surface of the medium. Even when a detector is disposed extremely in the vicinity of the recording medium, a stable running or flying state of the head can be realized.

In the above-described information recording medium, the direction in which the magnetic recording layer is magnetized for tracking is preferably made perpendicular to the surface of the disk. When the direction of magnetization is made perpendicular to the surface of the disk, there is no possibility that the magnetized regions magnetized in different directions and alternately arranged in the radial direction of the disk may weaken magnetic force one another. As a result, the magnetic force of each magnetized region becomes stable.

In order to form the substrate of the information recording medium, aluminum, glass, polycarbonate and the like may be used in the same way as in general hard disk drives. Preferably, a disk-shaped flexible and non-magnetic substrate is used. When the flexible and non-magnetic substrate is used as the substrate, head crash caused when the disk contacts the head is alleviated. Even when the head is disposed extremely in the vicinity of the recording medium as in the next-generation high density recording system using a flying head, the head and the disk stably slide in contact with each other, and stable running of the head becomes possible. Further, since the flexible and non-magnetic substrate is used as the base material, the information recording medium can be manufactured at a low cost.

A reflective film is preferably formed between the substrate and the magnetic recording layer. Even when near field light is used as recording and reproducing light, near field light which is non-propagation light, is converted to propagation light and is reflected by the reflective film. Therefore, when light into which the near field light is reflected by the surface of the magnetic recording layer, is detected utilizing a magnetic Kerr effect, the reflected light based on the propagation light is detected by Faraday effect and S/N of a detection signal improves. That is, so-called enhancement effect can be obtained.

The discrete servo fields can be in advance magnetically recorded in the magnetic recording layer. Due to the discrete servo fields being in advance magnetically recorded in the magnetic recording layer, the servo fields are read out by utilizing a magneto-optical effect such as Kerr effect at the time of recording or reproducing and sector servo can be performed. Due to the tracking servo and the sector servo being used together, accurate tracking becomes possible and the access speed to a predetermined area becomes higher.

The magnetized regions can be formed so as to extend in a meandering (serpentine) line at a fixed frequency. When so-called wobbles are applied to the magnetized regions, it is possible to detect a tracking signal and also generate a clock signal or an address signal.

In accordance with the seventh aspect of the present invention, the method for recording and reproducing an for information recording medium has a feature that the information recording medium of the present invention is used and at least one of recording and reproducing of information is carried out while carrying out tracking based on the difference in the directions in which the magnetized regions of the magnetic recording layer are magnetized. In the information recording medium of the present invention, the magnetic recording layer is in advance magnetized concentrically or spirally around the center of the disk for tracking and is provided such that the magnetized regions magnetized in different directions are alternately arranged in the radial direction of the disk. Accordingly, when at least one of recording and reproducing of information is carried out using the information recording medium, at least one of the recording and the reproducing can be carried out while accurately performing tracking servo based on the difference in the directions in which the magnetized regions are magnetized, and recording and reproducing of a signal can be carried out at a favorable S/N.

In the above-described method, the magnetized regions are irradiated with linearly polarized light and the direction in which the plane of polarization of reflected light rotates corresponding to the difference in the directions in which the magnetized regions are magnetized, is detected, and based on the detected direction in which the plane of polarization of the reflected light rotates, tracking can be performed. When at least one of recording and reproducing of information is carried out, the magnetized regions are irradiated with linearly polarized light and the direction in which the plane of polarization of the reflected light rotates corresponding to the difference in the directions in which the magnetized regions are magnetized, can be detected by utilizing a magnetic Kerr effect. Based on the detected direction in which the plane of polarization of the reflected light rotates, tracking can be performed.

As the linearly polarized light used for tracking, near field light can be used. Further, a tracking error detection system for tracking is preferably a three-beam method in which the directions in which the planes of polarization of light into which two tracking beams are reflected, are detected and the two detection values are compared with each other.

In the above-described method, information is preferably recorded in the magnetized regions. Since information is recorded in the magnetized regions magnetized in advance for tracking, it is possible to prevent reduction in the recording capacity caused by an increase in the area of a servo region.

An information recording method has a feature that information is recorded in the magnetized regions by a light modulation system or a magnetic modulation system. The magnetic recording layer of the information recording medium is irradiated with light and a portion irradiated with the light is heated to a Curie temperature or thereabouts, and due to a magnetic field being applied to the magnetic recording layer from the magnetic head, information is magnetically recorded. The system for recording information may either the light modulation system or the magnetic modulation system. Further, light used for the recording may be light into which laser light oscillated by semiconductor laser or the like is condensed by an optical lens in a general manner. Further, the recording can be carried out while effecting irradiation of near field light. As the laser light source, a semiconductor laser having an oscillation wavelength, for example, ranging from 400 to 780 nm can be used. In order to increase the recording density, blue-violet semiconductor laser, blue-violet SHG laser comprised of infrared semiconductor laser and a wavelength conversion element (SHG), or the like is preferably used. The blue-violet semiconductor laser having a wavelength of 405 nm or thereabouts is particularly preferable.

When information is recorded, information can be magnetically recorded only in a magnetized region magnetized in a predetermined direction. In this case, when the magnetized region magnetized in the predetermined direction is made wider than a magnetized region magnetized in a different direction, format efficiency improves. Further, information can be recorded in such a manner that the magnetized region magnetized in the predetermined direction can be divided into a plurality of tracks. In this case as well, format efficiency improves.

In order to reproduce recorded information, a method is provided, wherein the magnetized regions are irradiated with linearly polarized light, and the direction in which the plane of polarization of the reflected light rotates corresponding to the difference in the directions in which the magnetized regions are magnetized, is detected, and base on the detected direction in which the plane of polarization of the reflected light rotates, information recorded in the magnetized regions is reproduced. According to this method, the information recorded in the magnetized regions can be reproduced by utilizing a magnetic Kerr effect.

Another method for reproducing recorded information is a method in which electric current is generated by electromagnetic induction from magnetism of the magnetized regions, and the direction in which electric current flows corresponding to the difference in the directions in which the magnetized regions are magnetized, is detected, and based on the detected direction of electric current, information recorded in the magnetized regions is reproduced. According to this method, the information recorded in the magnetized regions can be reproduced by utilizing electromagnetic induction.

Still another method for reproducing recorded information is a method in which electrical resistance is changed due to magnetism of the magnetized regions and a variation in electrical resistance is detected, and based on the detected variation in electrical resistance, information recorded in the magnetized regions is reproduced. According to this method, the information recorded in the magnetized regions can be reproduced by utilizing a magnetic resistance effect.

When recording and reproducing of information is carried out, preferably, recording and reproducing may be carried out in such a manner that the surface of the magnetic recording layer and the magnetic head are made close to each other with a distance therebetween of 100 nm or less on a disk-surface average. That is, it is preferable that recording and reproducing of information be carried out in such a state that the information recording medium and the magnetic head stably slide in contact with each other. Such state can be realized when, for example, a disk-shaped flexible and non-magnetic substrate is used. So long as the surface of the magnetic recording layer and the magnetic head are moved close to each other with a distance therebetween of 100 nm or less on a disk-surface average, high density recording utilizing near field light becomes possible.

In accordance with the twenty-third aspect of the present invention, the information recording medium comprises a disk-shaped smooth (flat) base plate having no groove or pit (hole) used for tracking servo or data recording, and, formed on the base plate, a magnetic recording layer for magnetically recording information. Therefore, as the same as the information recording medium according to the first aspect, based on the difference in the magnetized directions in the magnetized regions, tracking can be performed. Further, tracking can be continuously performed and accurate tracking servo can be performed. Moreover, it is not necessary to form unevenness (convexoconcave) on the disk-shaped smooth base plate. Even when the detector is disposed extremely in the vicinity of the recording medium, a stable running or flying state of the head can be realized.

In the information recording medium according to the twenty-fourth aspect of the present invention, the directions in which the magnetized regions are magnetized are made perpendicular to the surface of the disk. Therefore, as described above, the magnetic force of each magnetized region becomes stable.

In the information recording medium according to the twenty-fifth and twenty-sixth aspects of the present invention, it is possible to prevent corrosion of the magnetic recording layer, or abrasion caused by near contact or contact-sliding of the head and the disk at the time of recording and reproducing information, and also improve running durability and corrosion resistance. Further, no groove or pit is used by (formed in) the base plate of the present invention. As a result, recording or reproduction of information can be carried out in such a manner that the surface of the magnetic recording layer and the head are close to each other with a distance between of 100 nm or less in an entire data area, that is, the information recording medium and the head stably slide in contact with each other. Therefore, high density recording using near field light becomes possible.

In the information recording medium according to the twenty-eighth aspect of the present invention, since the reflective film is formed, in magneto optic recording utilizing normal light, the reflectance becomes higher and the strength of a signal increases. Further, even when near field light is used, as described above, when reflected light of which near field light is reflected by the surface of the magnetic recording layer, is detected by utilizing a magnetic Kerr effect, enhancement effect can be obtained.

In the information recording medium according to the twenty-ninth aspect of the present invention, since the flexible and non-magnetic base plate is used as the base plate, as described above, crash caused when the head and the disk come in contact with each other is alleviated. Even when the head is disposed extremely in the vicinity of the recording medium, the head and the disk stably slide in contact with each other, and stable running of the head becomes possible.

In addition to a concentric or spiral tracking signal, as described above, discrete servo fields may also be in advance magnetically recorded in the magnetic recording layer of the information recording medium.

In the above-described information recording medium, the magnetized regions of the magnetic recording layer may be formed so as to extend in a meandering line at a fixed frequency. When so-called wobbles are applied to the magnetized regions, it is possible to detect a tracking signal and also generate a clock signal or an address signal. Further, a tracking error detection system for tracking is preferably a three-beam method described above.

As described above, the information recording medium may also be used such that information may be magnetically recorded only in magnetized regions magnetized in a predetermined direction.

Further, light used for recording and reproducing information of the information recording medium may be light such that laser light oscillated by semiconductor laser or the like is condensed by an optical lens in a general manner. Alternatively, recording can be carried out while effecting irradiation of near field light.

The information recording medium used by the method for recording and reproducing for an information recording medium according to the thirtieth aspect of the present invention has a magnetic recording layer formed on a disk-shaped smooth base plate. Accordingly, as the same as the information recording medium according to the first aspect, based on the difference in the magnetized directions in the magnetized regions, tracking can be performed. Further, tracking can be continuously performed and accurate tracking servo can be performed. Moreover, it is not necessary to form unevenness (convexoconcave) on the disk-shaped smooth base plate. Even when the detector is disposed extremely in the vicinity of the recording medium, a stable running or flying state of the head can be realized.

Information is magnetically recorded, using the information recording medium, in the magnetized region magnetized in advance for tracking. Therefore, it is possible to prevent reduction in the recording capacity caused by an increase in the area of a servo region. Further, a portion of the magnetized region irradiated with near field light is heated to a Curie temperature or thereabouts by being irradiated with the light, and information is magnetically recorded by applying a magnetic field in which magnetic force acts in a predetermined direction from the magnetic head. Therefore, a recording mark smaller than a recording mark formed by normal light recording can be formed and high density recording can be carried out. Further, tracking is continuously performed as described above and accurate tracking servo can be performed. As a result, recording of a signal at a favorable S/N can be carried out.

The discrete servo fields may be in advance magnetically recorded together with a concentric or spiral tracking signal in the magnetic recording layer of the information recording medium used for recording of information, as described above.

Further, the magnetized regions on the magnetic recording layer of the information recording medium can be formed so as to extend in a meandering line at a fixed frequency, as described above.

Moreover, in the above-described information recording medium, the magnetized regions magnetized in a predetermined direction each may be made wider than a magnetized region magnetized in a different direction as described above.

In the method for recording and reproducing for an information recording medium according to the thirty-first aspect of the present invention, information is magnetically recorded by applying a magnetic field perpendicular to the surface of the disk (that is, vertical magnetization). As a result, recording bits magnetized in different directions may be disposed adjacent to each other and may not weaken magnetic force each other. As a result, the magnetic force of a recording region becomes stable.

In the method for recording and reproducing for an information recording medium according to the thirty-second aspect of the present invention, near field light exists only in a region starting from an emission end and less than a wavelength of the light. Therefore, it is necessary that recording be carried out with the emission end and the detector being disposed extremely in the vicinity of the recording medium.

In the method for recording and reproducing for an information recording medium according to the thirty-third aspect of the present invention, recording of information can be carried out by a so-called light modulation recording system.

In the method for recording and reproducing for an information recording medium according to the thirty-fourth aspect of the present invention, recording of information can be carried out by a so-called magnetic modulation recording system.

In the method for recording and reproducing for an information recording medium according to the thirty-fifth aspect of the present invention, the flexible and non-magnetic base plate is used as the base plate.

In the method for recording and reproducing for an information recording medium according to the thirty-sixth aspect of the present invention, it is preferable that recording of information may be carried out in a state in which the information recording medium and the magnetic head stably slide in contact with each other. This state can be realized when a disk-shaped flexible and non-magnetic base plate is used.

In the method for recording and reproducing for an information recording medium according to the thirty-seventh aspect of the present invention, near field light which is non-propagation light is converted to propagation light and reflected by the reflective film. When light into which near field light is reflected by the surface of the magnetic recording layer is detected by utilizing a magnetic Kerr effect, the enhancement effect can be obtained, as described above. Further, when information is reproduced by utilizing a magnetic Kerr effect as well, an enhancement effect can be obtained similarly. Further, as a tracking error detection system for tracking, the three-beam method is used, as described above.

In the method for recording and reproducing for an information recording medium according to the thirty-eighth aspect of the present invention, when information is recorded in the magnetized region magnetized in the predetermined direction, the magnetized region is divided into a plurality of tracks for recording, thereby improvement in format efficiency.

The information recording medium manufactured by the manufacturing method according to the thirty-ninth aspect of the present invention has the magnetic recording layer for magnetically recording information. Since the magnetic recording layer is in advance magnetized for tracking such that the magnetized regions magnetized in different directions are alternately arranged in the radial direction of the disk, tracking can be performed based on the difference in the directions in which the magnetized regions are magnetized. Further, the magnetic recording layer is in advance magnetized concentrically or spirally around the center of the disk for tracking. Therefore, tracking can be continuously performed and accurate tracking servo can also be performed. Moreover, tracking can be performed based on the difference in the directions in which the magnetized regions are magnetized, and therefore, it is not necessary to form unevenness on the surface of the medium. Even when the detector is disposed extremely in the vicinity of the recording medium, a stable running or flying state of the head can be realized.

In the manufacturing method according to the thirty-ninth aspect of the present invention, the information recording medium is manufactured in such a manner that the magnetic recording layer is entirely magnetized in a predetermined direction and formed concentrically or spirally around the center of the disk, and a magnetic layer of a disk-shaped master carrier having an unevenness pattern in which at least convex portions are covered by the magnetic layer, is closely applied to the surface of the magnetic recording layer of the information recording medium, and a magnetic field in which magnetic force acts in a direction different from the predetermined direction is applied to the magnetic recording layer via the magnetic layer, to thereby reverse a direction in which a portion with the magnetic layer applied thereto is magnetized. Due to the magnetic field being applied to the magnetic recording layer via the magnetic layer of the master carrier, a large quantity of information can be recorded in an extremely short time and excellent productivity is obtained. Further, static recording can be carried out without changing the relative positions of the master carrier and the information recording medium, and preformat-recording can be precisely carried out.

When a magneto-optic recording medium is used, it is preferable that, particularly, in a state in which at least one of the master carrier and the slave medium is heated, the master carrier and the slave medium be closely adhered to each other and a transfer magnetic field be applied thereto.

The heating temperature is preferably in the range from 100 to 300° C., and more preferably in the range from 150 to 250° C. In the above-described temperature range, coercive force Hc decreases and recording (writing) can be easily carried out.

In the above-described manufacturing method of an information recording medium, the predetermined direction can be made perpendicular to the surface of the disk. Due to the direction in which the magnetized regions are magnetized being made perpendicular to the surface of the disk, there is no possibility that the magnetized regions magnetized in different directions and alternately arranged in the radial direction of the disk may weaken magnetic force one another. As a result, the magnetic force of each magnetized region becomes stable.

BRIEF DESCRIPTION OF THE DRAWINGS

FIGS. 2A to 2C are cross sectional views showing a magnetic transfer process.

FIGS. 9A to 9E are diagrams for illustrating the tracking principle by a three-beam system.

FIG. 13 is a block diagram which schematically shows a magneto-optic disk recording and reproducing device which can be used by an information recording method of the present invention.

DESCRIPTION OF THE PREFERRED EMBODIMENTS

Referring now to the attached drawings, embodiments of the present invention will be described in detail.

[First Embodiment]

Figure 1A:
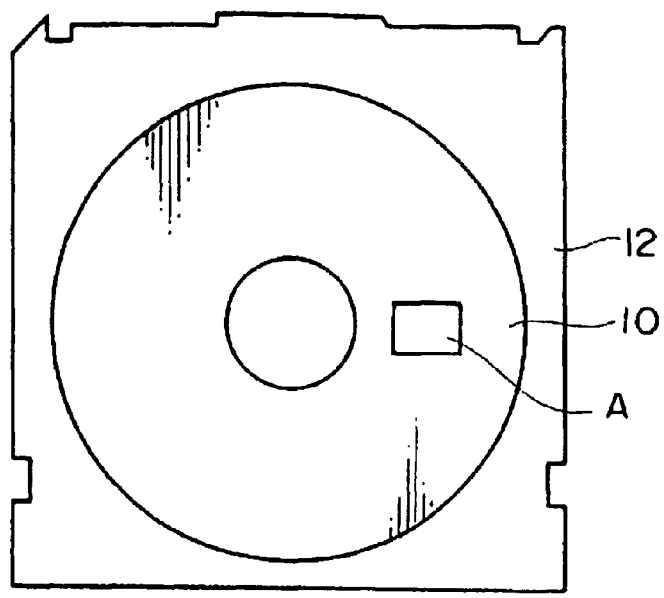
FIG. 1A is a plan view which schematically shows the structure of a magneto-optic disk according to an embodiment of the present invention.

A magneto-optic (MO) disk 10 according to the first embodiment, which is the information recording medium of the present invention, may be used in the form of a general hard disk drive, but is preferably a so-called flexible disk having a center hole formed at the center thereof as shown in FIG. 1A so as to have compatibility and permit contact recording. The flexible disk is accommodated in a cartridge 12 made of plastic or the like. The cartridge 12 is usually provided with an access window (not shown) covered by a metal shutter (not shown), and recording and reproduction for the magneto-optic disk 10 is carried out via the access window.

Figure 1B:
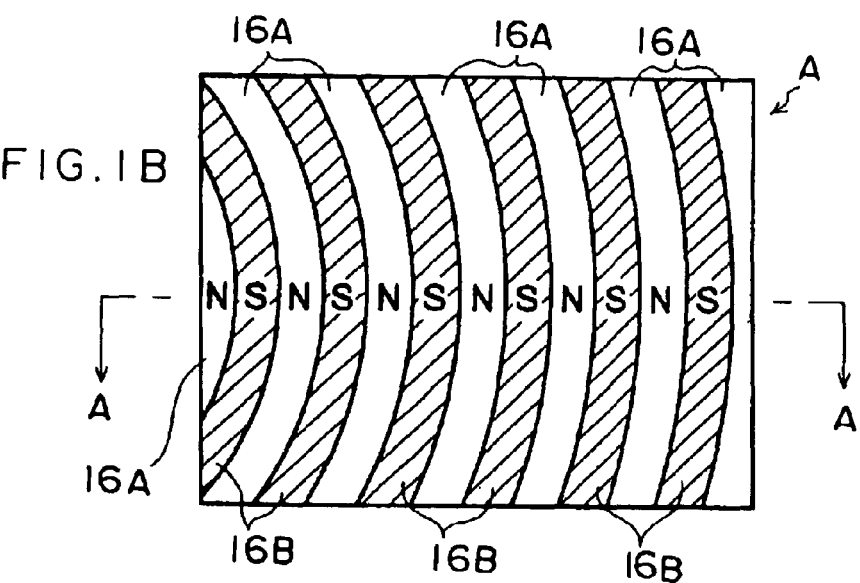
FIG. 1B is a partially enlarged view showing a magnetized state of the surface of a magnetic recording layer in a region A shown in FIG. 1A.
Figure 1C:
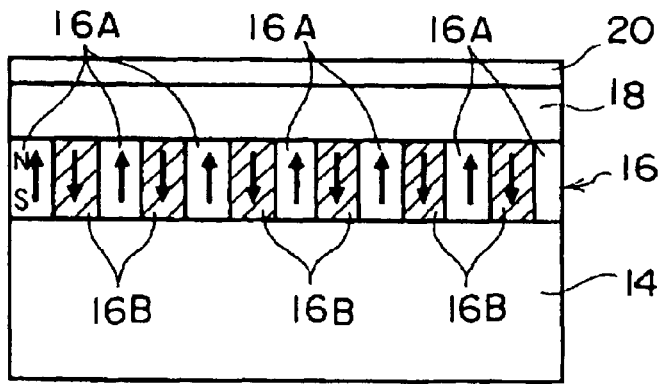
FIG. 1C is a cross sectional view taken along the line A—A in FIG. 1B.

As shown in FIG. 1C, the magneto-optic disk 10 is structured in such a manner that a magnetic recording layer 16 for magnetically recording information, a protective layer 18 for protecting the magnetic recording layer 16 against deterioration or abrasion, and a lubricating film 20 for improvement of running durability and corrosion resistance by providing a lubricating agent, are formed on a disk-shaped smooth substrate (support) 14 in layers in the order mentioned. The magnetic recording layer 16 is magnetized (preformat-magnetized) in a direction perpendicular to the surface of the disk, and is formed by magnetized regions 16A which are each magnetized so that the surface of the layer facing the substrate has a south (S) pole and the recording surface of the layer at the side opposite to the substrate has a north (N) pole, and magnetized regions 16B which are each magnetized so that the surface of the layer facing the substrate has a north pole and the recording surface of the layer has a south pole. These magnetized regions 16A and 16B are arranged alternately in the radial direction of the disk. FIG. 1B shows the magnetized state of the recording surface of the magnetic recording layer 16 in the region A shown in FIG. 1A. As shown in FIG. 1B, the magnetized regions 16A and the magnetized regions 16B are each formed concentrically or spirally around the center of the disk, and each of the regions form a track. That is, the magnetized regions 16A and the magnetized regions 16B are used as a tracking guide based on a difference in the directions in which the regions are magnetized, and also used as a recording region. The magneto-optic disk 10 is irradiated with laser light from the side of the magnetic recording layer 16, and recording and reproducing of information is carried out therefor.

Figure 7:
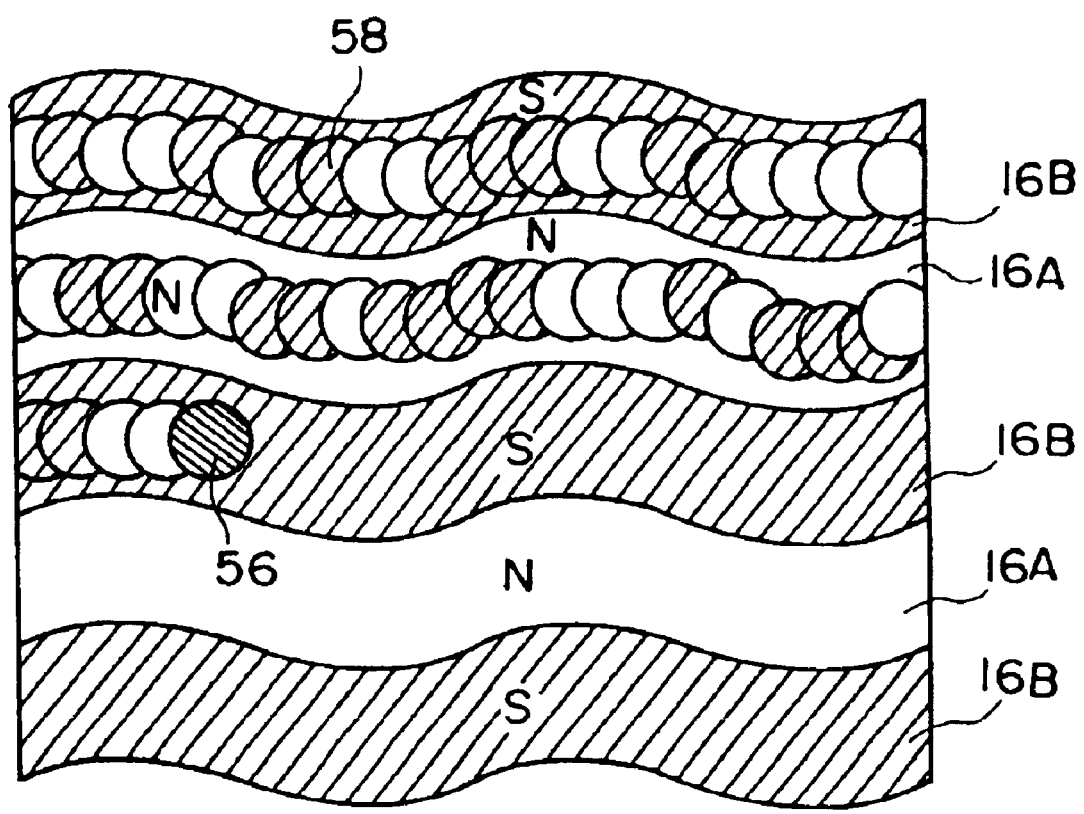
FIG. 7 is a plan view showing a recording pattern when information is recorded by a magnetic modulation system.

As shown in FIG. 7, the magnetized regions 16A and the magnetized regions 16B may also be formed so as to extend in a meandering line (that is, apply wobbles). The meandering frequency of the wobble is detected and can be used as a control signal for controlling the linear velocity. For example, by applying wobbles having the same frequency to the magnetized regions from the inner periphery to the outer periphery of the disk, the linear velocity can be controlled so as to become fixed irrespective of the position in the radial direction. Further, by applying the wobbles having cycles which becomes longer from the inner periphery to the outer periphery, the angular velocity of the disk can be controlled so as to become fixed. That is, a clock signal or an address signal can be generated by applying wobbles to the magnetized regions.

The substrate 14 is preferably comprised of a resin film having flexibility so as to avoid a crash in the state of coming into contact with a head. Examples of material of such resin film include aromatic polyimide, aromatic polyamide, aromatic polyamidoimide, polyether ether ketone, polyether sulfone, polyether imide, polysulfone, polyphenylene sulfide, polyethylene naphthalate, polyethylene terephthalate, polycarbonate, triacetate cellulose and fluororesin.

Further, a different resin film may be laminated on the substrate 14. Due to lamination of the different resin film, warping or winding resulting from the substrate 14 can be alleviated and flaw resistance of the magnetic recording layer can be remarkably improved. Examples of laminating technique include roll laminating using a heat roller, laminating using a flat plate-shaped heat press, dry laminating in which an adhesive agent is applied to an adhesion surface and laminated, and laminating using an adhesive sheet previously formed in the shape of a sheet. The kind of the adhesive agent is not particularly limited, and general hot melt adhesives, thermosetting adhesives, UV adhesives, EB adhesives, pressure sensitive adhesive sheet, anaerobic adhesives and the like can be used.

The thickness of the substrate 14 is in the range from 10 to 200 $\mu$m, preferably in the range from 20 to 150 $\mu$m, and more preferably in the range from 30 to 100 $\mu$m. If the thickness of the substrate 14 is too small, stability at the time of high speed rotation deteriorates and runout of the disk surface increases. On the other hand, if the thickness of the substrate 14 is too large, rigidity at the time of rotation becomes higher and it is difficult to avoid head crash at the time of coming in contact with the head, thereby causing jumping of the recording head.

The surface of the substrate 14 is preferably made smooth as far as possible for the purpose of recording by a magnetic head. If the surface of the substrate 14 is made into unevenness, recording and reproducing characteristics are deteriorated. Specifically, when an undercoat layer, which will be described later, is used, the surface roughness measured by an optical surface roughness tester is 5 nm or less at the center line average height Ra, and preferably 2 nm or less. The height of protrusions measured by a tracer type roughness tester is 1 $\mu$m or less, and preferably 0.1 $\mu$m or less. Further, when no undercoat layer is used, the surface roughness measured by an optical surface roughness tester is 3 nm or less at the center line average height Ra, and preferably 1 nm or less. The height of protrusions measured by a tracer type roughness tester is 0.1 $\mu$m or less, and preferably 0.06 $\mu$m or less.

An undercoat layer is preferably provided on the surface of the substrate 14 at the side in which the magnetic recording layer 16 is formed, for the purpose of improvement in flatness. Since the magnetic recording layer 16 is formed by sputtering or the like, the undercoat layer is preferably excellent in heat resistance. Examples of material of the undercoat layer include polyimide resin, polyamidoimide resin, silicon resin and fluorine based resin. Thermosetting polyimide resin and thermosetting silicon resin are particularly preferable from the standpoint of obtaining a high smoothing effect. The thickness of the undercoat layer is preferably in the range from 0.1 to 3.0 $\mu$m. When a different resin film is laminated on the substrate 14, the undercoat layer may be formed before laminating or may be formed after laminating.

As the thermosetting polyimide resin, polyimide resin obtained by thermal polymerization of an imide monomer having at least two terminal unsaturated groups within a molecule as in, for example, bisallylunadiimide "BANI" manufactured by Maruzen Petrochemical Company, Limited is suitably used. The imide monomer can be thermally polymerized at a relatively low temperature after having been applied onto the surface of the substrate in the state of a monomer. Thus, the above-described resin can be set in such a manner that the monomer which forms raw material of the undercoat layer is immediately applied onto the substrate. Therefore, a general purpose solvent can be used and spreading of the resin over the uneven surface is good, which leads to a raised smoothing effect.

As the thermosetting silicon resin, silicon resin in which a silicon compound into which an organic group is introduced, is used as raw material and polymerized by a sol-gel process, is suitably used. The silicon resin is comprised of a structure in which a part of silicon dioxide bond is substituted for an organic group, and is much more excellent in heat resistance than silicon rubber and is also more excellent in flexibility than a silicon dioxide film. Therefore, even if a resin film is formed on the substrate comprised of a flexible film, crack or peeling is not apt to occur. Further, the monomer which is the raw material can be immediately applied onto the substrate and set. Therefore, a general purpose solvent can be used and spreading of the resin over the uneven surface is good, which leads to a raised smoothing effect. Moreover, condensation polymerization reaction progresses from a relatively low temperature due to addition of catalyst such as acid or chelating agent. As a result, the resin can be set in a short time and a resin film can be formed using a general purpose coating device.

Minute protrusions are preferably formed on the surface of the undercoat layer for purposes of reducing a true contact area with a head and improving sliding properties. Further, due to provision of minute protrusions, handling efficiency of the substrate becomes favorable. Examples of the method for forming minute protrusions can include a method for applying spherical silica grains, a method for forming protrusions of organic substance by applying an emulsion, and the like. Particularly, the method for forming minute protrusions by applying spherical silica grains is preferably used for the purpose of maintaining heat resistance of the undercoat layer.

The heightwise dimension of the minute protrusions is preferably in the range from 5 to 60 nm, and more preferably in the range from 10 to 30 nm. If the heightwise dimension of the minute protrusions is to high, recording/reproducing characteristics of a signal deteriorate due to spacing loss between the recording/reproducing head and the medium. Further, if the heightwise dimension of the minute protrusions is to low, an effect of improvement in sliding properties decreases. The density of the minute protrusions is preferably in the range from 0.1 to $100/\mu m^2$, and more preferably in the range from 1 to $10/\mu m^2$. If the density of the minute protrusions is too low, an effect of improvement in sliding properties decreases. If the density of the minute protrusions is too high, an increase of aggregating grains causes a large number of high protrusions, and recording and reproducing characteristics are deteriorated.

Further, the minute protrusions can be fixed to the surface of the substrate by using a binder. The binder preferably includes resin having sufficient heat resistance. Thermosetting polyimide resin and thermosetting silicon resin are particularly preferably used as the resin having heat resistance.

A reflective film is preferably provided between the substrate 14 and the magnetic recording layer 16 as in a general magneto-optic disk. As the reflective film, a light reflex material having a high reflectance to laser light is used. Examples of the light reflex material include metals and semi-metals such as Al, Al—Ti, Al—In, Al—Nb, Au, Ag and Cu. These materials may be used singly or may also be used in a combination of two or more. Further, they may also be used in the form of an alloy. Among them, the reflective film is particularly preferably comprised of the light reflex material such as Al alloy or Ag alloy. The near-field light which is non-propagation light is transformed into propagation light and reflected by the reflective film. Therefore, when light into which the near-field light is reflected by the surface of the magnetic recording layer is detected by using a magnetic Kerr effect, reflected light based on the propagation light is detected by Faraday effect and the S/N of a detection signal improves (enhancement effect). The reflective film comprised of Al alloy or Ag alloy has a high reflectance, and therefore, a high enhancement effect can be obtained.

The above-described reflective film can be formed by spattering or electron-beam vacuum deposition of the above-described light reflex material on the substrate 14. The film thickness of the reflective film is preferably in the range from 10 to 200 nm.

A magnetic recording material such as various metal alloys generally used for the magneto-optic recording medium can be used for the magnetic recording layer 16. A magnetic recording material having perpendicular magnetic anisotropy and excellent magneto optic characteristics and also having Curie point of 200° C. or thereabouts is preferable. Examples of such magnetic recording material include rare earth transition metal amorphous material. Specifically, TbFeCo, NdFeCo, GdFeCo and DyFeCo are preferable. Further, a magnetic recording material with Cr being added to these alloys is more preferable for the purpose of improvement in corrosion resistance. Among them, TbFeCo based alloy is particularly preferable for the reason that it has a high perpendicular magnetic anisotropy and even very small recording mark can be stably recorded. The magnetic recording layer 16 can be produced by, for example, sputtering, and the thickness thereof is preferably in the range from 10 to 50 nm.

A super resolution layer is preferably provided on the magnetic recording layer 16 for purposes of reducing a recording mark and increasing the recording density. The super resolution layer causes super resolution by utilizing the rule that the property of the material which forms the layer changes in the center portion of laser light spot. Super resolution includes two types, that is, optical super resolution and magnetic super resolution. The optical super resolution can be used in both recording and reproducing of a signal, and the action of heat (heat mode) and the action of a photon (photon mode) can both be used. Examples of the optical super resolution layer include Ag—O thin film, Sb thin film and photochromic polymer thin film. The magnetic super resolution is utilized for readout of a signal by light. For example, when a plurality of magnetic recording layers are formed in layers, the difference in variations of magnetization to heat between the magnetic recording layers can be used to take out only magnetic signals recorded on some of the magnetic recording layers.

It is preferable that a dielectric protective film be provided adjacent to the magnetic recording material 16 for purposes of enhancing a magneto-optical effect using interference of light and improving the recording characteristics of the magnetic recording material 16. A dielectric material generally used in magneto-optical recording can be used for the dielectric protective film. For example, Si—N, Si—O, Al—N, Al—O and Zn—S are used. Among them, Si—N and Al—N are particularly preferable from the standpoint of inhibiting reaction between oxygen and metal material included in the magnetic recording layer and having a high heat conductivity. Si—N or Al—N is particularly preferable. The dielectric protective film can be formed by sputtering, chemical vapor phase reaction (CVD) or the like. The film thickness of the dielectric protective film is preferably in the range from 10 to 200 nm.

The protective layer 18 is provided for purposes of preventing corrosion of metal material contained in the magnetic recording layer 16 and preventing abrasion caused by near contact or contact sliding of the head and the disk to thereby improve running durability and corrosion resistance. Particularly, when rare earth metal is used for the magnetic recording layer 16, the protective layer 18 is essentially required because rare earth transition metal is very apt to corrode.

The protective layer 18 can be formed by using oxide such as silica, alumina, titania, zirconia, cobalt oxide or nickel oxide, nitride such as titanium nitride, silicon nitride or boron nitride, carbide such as silicon carbide, chromium carbide or boron carbide, or carbon such as graphite or amorphous carbon. The protective layer 18 is preferably comprised of a hard film whose hardness is greater than or equal to that of a head material, and also preferably has an effect in that seizing is not apt to occur during sliding movement and maintains the effect from the standpoint of obtaining excellent sliding durability. Moreover, the protective layer more preferably has a smaller number of pinholes formed therein from the standpoint of excellent corrosion resistance. An example of such protective film is a hard carbon film referred to as diamond-like carbon (DLC) produced by CVD. Further, in consideration of optical characteristics, silicon nitride is preferable.

The lubricating film 20 is provided on the protective layer 18 for the purpose of improving running durability and corrosion resistance. A lubricating agent such as publicly-known hydrocarbon based lubricating agent, fluorine based lubricating agent or extreme-pressure additive is used for the lubricating film 20.

Examples of the hydrocarbon based lubricating agent include carboxylic acids such as stearic acid or oleic acid, esters such as butyl stearate, sulfonic acids such as octadecyl sulfonic acid, phosphoric esters such as monooctadecyl phosphate, alcohols such as stearyl alcohol or oleyl alcohol, carboxylic acid amides such as amide stearate, and amines such as stearyl amine.

Examples of the fluorine based lubricating agent include a lubricating agent obtained by substituting a fluoroalkyl group or perfluoropolyether group for all or a part of the alkyl group of the above-described hydrocarbon based lubricating agent. Examples of perfluoropolyether group include perfluoromethyleneoxide polymer, perfluoroethyleneoxide polymer, perfluoro-n-propyleneoxide polymer $(CF_2CF_2CF_2O)n$, perfluoroisopropyleneoxide polymer $(CF(CF_3)CF_2O)n$, or copolymers thereof. Specifically, perfluoromethylene-perfluoroethylene copolymer having a hydroxyl group at molecular weight end (manufactured by Audimont Co.; trade name is "FOMBLIN Z-DOL") is used.

Examples of extreme-pressure additive include sulfur based extreme-pressure agents such as phosphoric esters such as trilauryl phosphate, phosphorous acid esters such as trilauryl phosphite, thiophosphorous acid ester such as trilauryl trithiophosphite, or thiophosphoric esters, dibenzyl disulfide and the like.

The above-described lubricating agent may be used singly or may be used in a combination thereof. A solution with the lubricating agent dissolved in an organic solvent may merely be applied onto the surface of the protective layer 18 by spin coating, wire bar coating, gravure coating or dip coating, or may be merely adhered to the surface of the protective layer 18 by vacuum deposition. The amount of the lubricating agent to be coated is preferably in the range from 1 to 30 $mg/m^2$, and particularly preferably in the range from 2 to 20 $mg/m^2$.

Further, a rust preventive agent is preferably used for the purpose of further improving corrosion resistance. Examples of the rust preventive agent include nitrogen containing heterocyclic rings such as benzotriazole, benzimidazole, purine and pyrimidine, and derivatives with alkyl side chains introduced into mother nuclei of the heterocyclic rings, nitrogen and sulfur containing heterocyclic rings such as benzothiazole, 2-mercaptobenzothiazole, tetrazaindene ring compound and thiouracil compound, and derivatives thereof. These rust preventive agents each may be applied onto the protective film in the state of being mixed with the lubricating agent, or may be applied onto the protective film and thereafter coated with the lubricating agent thereon. The amount of the rust preventive agent to be coated is preferably in the range from 0.1 to 10 $mg/m^2$, and particularly preferably in the range from 0.5 to 5 $mg/m^2$.

A preformat method of the magnetic recording layer 16 is not particularly limited. For example, a magnetized region may be written by a magnetic head, or a magnetized region may also be formed by magnetic transfer. In order that a magnetized region having a minute pattern be formed in a short time, the magnetized region is particularly preferably formed by magnetic transfer.

The magnetic transfer is a method in which, as shown in FIGS. 2A to 2C, magnetism is transferred from the master carrier 24 with a magnetic layer 28 formed therein, to the slave medium 22 having the magnetic recording layer 16 in the state of being not magnetized to thereby form a magnetized region of a predetermined pattern. The master carrier 24 is provided in such a manner that the convex magnetic layer 28 comprised of ferromagnetic material such as copper or iron having a large magnetic flux density and formed in accordance with the transfer pattern, is formed on a base plate 26 comprised of non-magnetic material such as silicon or aluminum. A conductive layer comprised of non-magnetic metal material such as chromium or titanium can be, if necessary, provided between the base plate 26 and the magnetic layer 28. The master carrier 24 can be produced by using a stamper used in photo-fabrication or formation of base plates for an optical disk. The master carrier 24 can be obtained by, for example, forming a magnetic layer on a nickel base plate having a predetermined pattern formed thereon, using a stamper.

[Second Embodiment]

A magneto-optic disk according to the second embodiment, which is the information recording medium of the present invention, is a so-called hard disk, and has the same structure as that of the magneto-optic disk according to the first embodiment except in that it is structured as a hard disk. Therefore, a description of the same portions will be omitted, and only different portions will be described.

A base plate having a relatively high hardness, for example, an aluminum base plate, a glass base plate, a polycarbonate base plate or a carbon base plate is used for the substrate 14. The thickness of the substrate 14 is preferably in the range from 0.2 to 2.0 mm, and more preferably in the range from 0.3 mm to 1.2 mm. The surface of the substrate 14 is preferably made smooth as far as possible for the purpose of recording by a magnetic head. Specifically, the base plate of a hard disk is subjected to varnish treatment so that the surface roughness measured by an optical surface roughness tester is 5 nm or less at the center line average height Ra, and preferably 2 nm or less. The height of protrusions measured by a tracer type roughness tester is 1 $\mu$m or less, and preferably 0.1 $\mu$m or less.

Further, recording and reproducing of information on the magneto-optic disk can be carried out in the same way as in the magneto-optic disk according to the first embodiment.

As described above, the magneto-optic disks according to the first and second embodiments have the following effects:

(1) the magnetic recording layer is magnetized for tracking in such a manner that magnetized regions which are in advance magnetized in different direction are alternately arranged in the radial direction of the disk, and therefore, tracking can be performed based on the difference in the directions in which the magnetized regions are magnetized. Due to tracking being thus performed based on the differences in the directions in which the magnetized regions are magnetized, it is not necessary to form unevenness on the surface of the medium. Even when a detector is disposed extremely in the vicinity of the recording medium, stable running or flying state of the head can be realized;

(2) the magnetic recording layer is in advance magnetized concentrically or spirally around the center of the disk for tracking, and therefore, tracking can be performed continuously and accurate tracking servo can be achieved, thereby resulting in recording and reproducing of a signal at a favorable S/N. Further, information is recorded in the magnetized regions magnetized in advance for tracking, and therefore, it is possible to prevent reduction of a recording capacity caused by an increase of a servo region. Particularly, since the directions in which the magnetized regions are magnetized are each made perpendicular to the surface of the disk, there is no possibility that the magnetized regions magnetized in different directions and alternately arranged in the radial direction of the disk may weaken magnetic force one another. As a result, magnetic force of each magnetized region is stabilized;

(3) tracking can be performed based on the differences in the directions in which the magnetized regions are magnetized, and therefore, it is not necessary to form unevenness on a disk-shaped smooth base plate. Even when a detector is disposed extremely in the vicinity of the recording medium as in a next-generation high density recording system using near field light (for example, evanescent light), a stable running or flying state of the head can be realized;

(4) the magneto-optic disk according to the first embodiment has, as base material, a substrate such as a resin film having flexibility. Therefore, the advantage of the disk is that head crash caused at the time of coming in contact with a magnetic head is avoided and the magneto-optic disk and the magnetic head stably slide in contact with each other with very weak force. Further, when the substrate such as a resin film having flexibility is used as the base material, the magneto-optic disk can be manufactured at a low cost; and (5) the magnetized regions are formed by so-called magnetic transfer, and therefore, batch reproduction of a large amount of servo information is permitted when a magnetic field is applied. Accordingly, the magnetized regions can be magnetized in an extremely short time. Further, the magnetized regions are statically magnetized, and therefore, accurate preformat-recording becomes possible.

There was described, in the above-described first and second embodiments, a case in which recording and reproducing of information is carried out by applying laser light from the side of the magnetic recording layer. However, there is also be applied a structure in which recording and reproducing of information is carried out by applying laser light from the side of the base plate. In this case, material having a high transmittance to laser light of a predetermined wavelength to be used for recording and reproducing, is used for the substrate.

Further, in the above-described first and second embodiments, there was described a case in which the magnetic recording layer is provided on one surface of the substrate, but the magnetic recording layer may also be provided on each of both surfaces of the substrate. Alternatively, the magnetic recording layers may be respectively provided on both surfaces of the disk in such a manner that substrates each having a magnetic recording layer on one surface thereof, are made overlapping with each other and the surfaces of the substrates with no magnetic recording layer formed thereon are disposed inside.

In the above-described first and second embodiments, recording and reproducing is carried out using near field light. However, recording and reproducing can also be carried out using other laser light sources generally used by a light information recording device.

Figure 6:
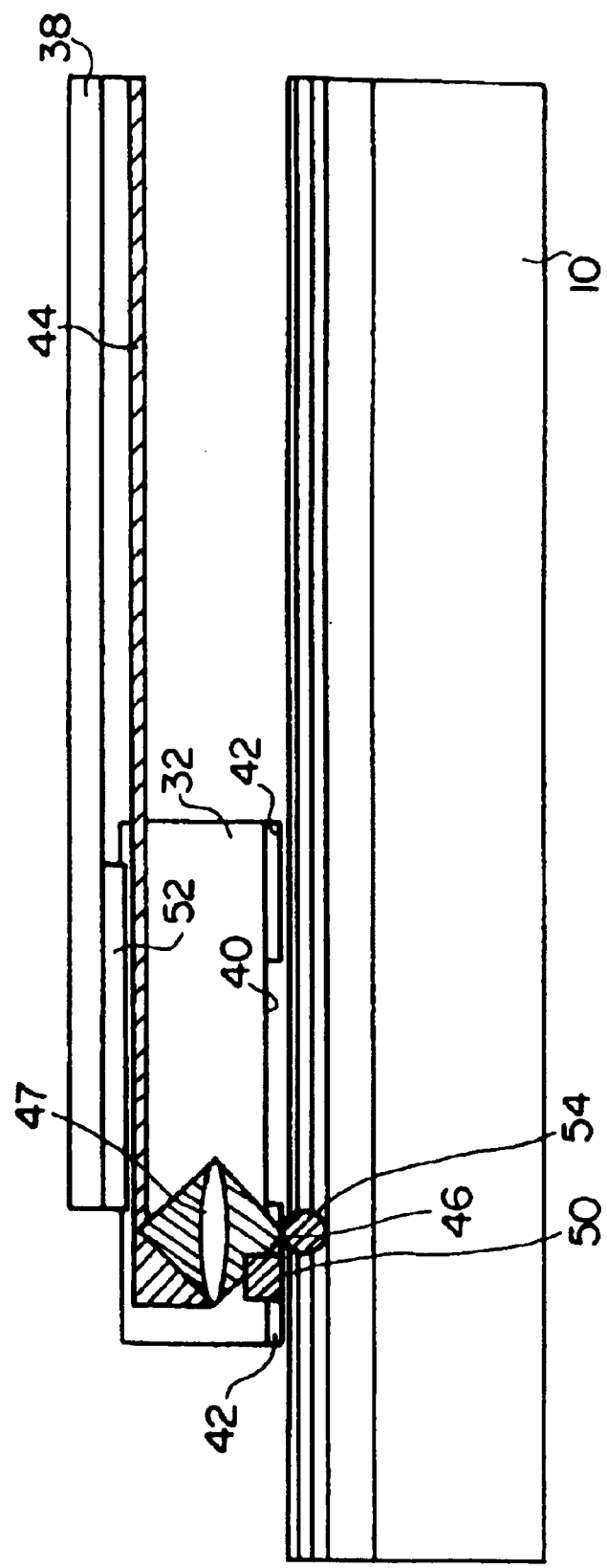
FIG. 6 is a cross sectional view taken along an optical axis, which schematically shows a recording/reproducing head of the recording and reproducing device shown in FIG.
Figure 8:
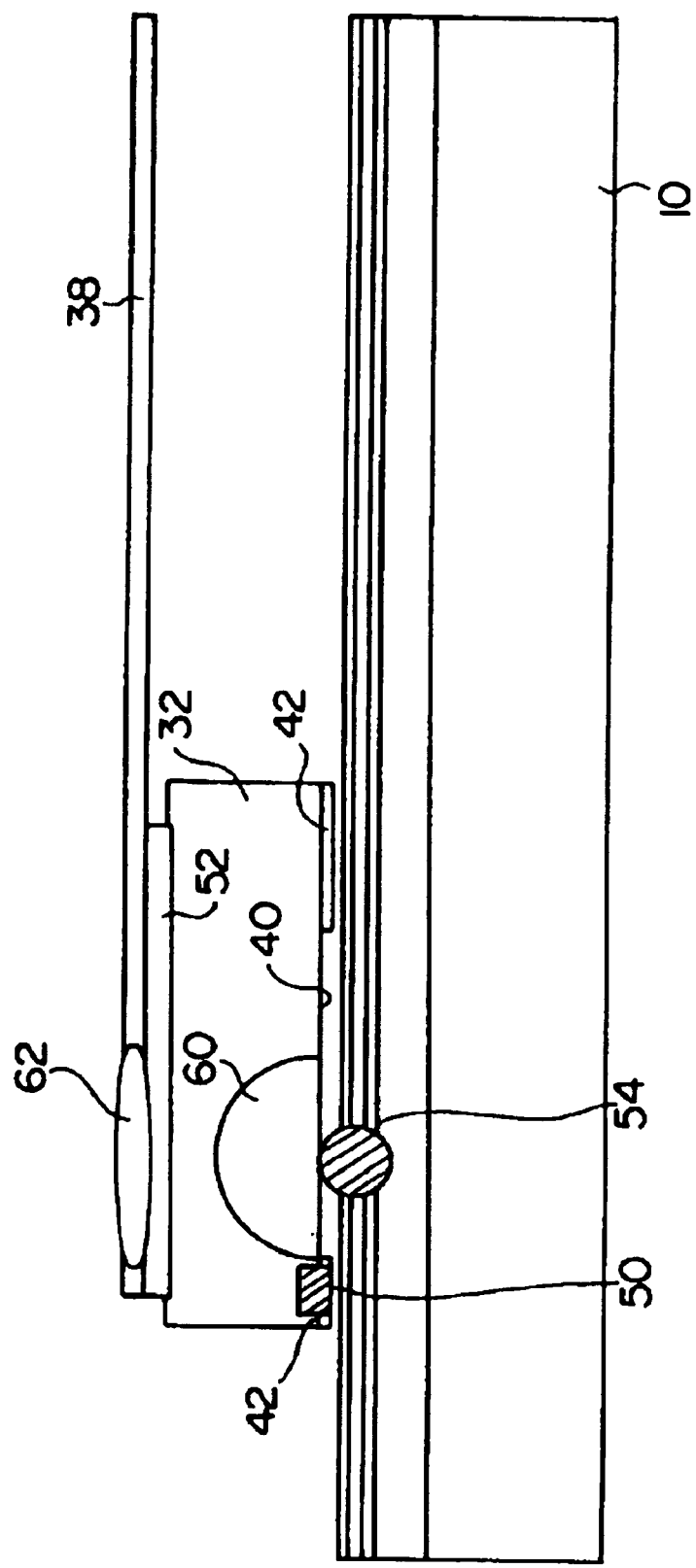
FIG. 8 is a plan view showing another example of the structure of the recording and reproducing device used in recording and reproducing of information in the magneto-optic disk according to the embodiment of the present invention.

There was also described, in the foregoing, a case in which a device for generating near field light by a microaperture is used. However, recording and reproducing can also be carried out using a device for generating near field light by condensing light in a solid immersion lens (SIL). In this device, as shown in FIG. 8, an SIL 60 is embedded in a floating slider 32 such that an emission surface thereof is exposed to a floating surface 40 of the floating slider 32. A condensing lens 62 for condensing light from outside of the floating slider 32 is disposed above the SIL 60 so as to form a focal point on the emission surface of the SIL 60 exposed to the floating surface 40. Near field light 54 is generated in the vicinity of the focal point by condensing light from outside of the floating slider 32 in the condensing lens 62 and forming the focal point on the emission surface of the SIL 60. The same structural portions as those of the device shown in FIG. 6 are denoted by the same reference numerals, and a description thereof will be described later.

Figure 4:
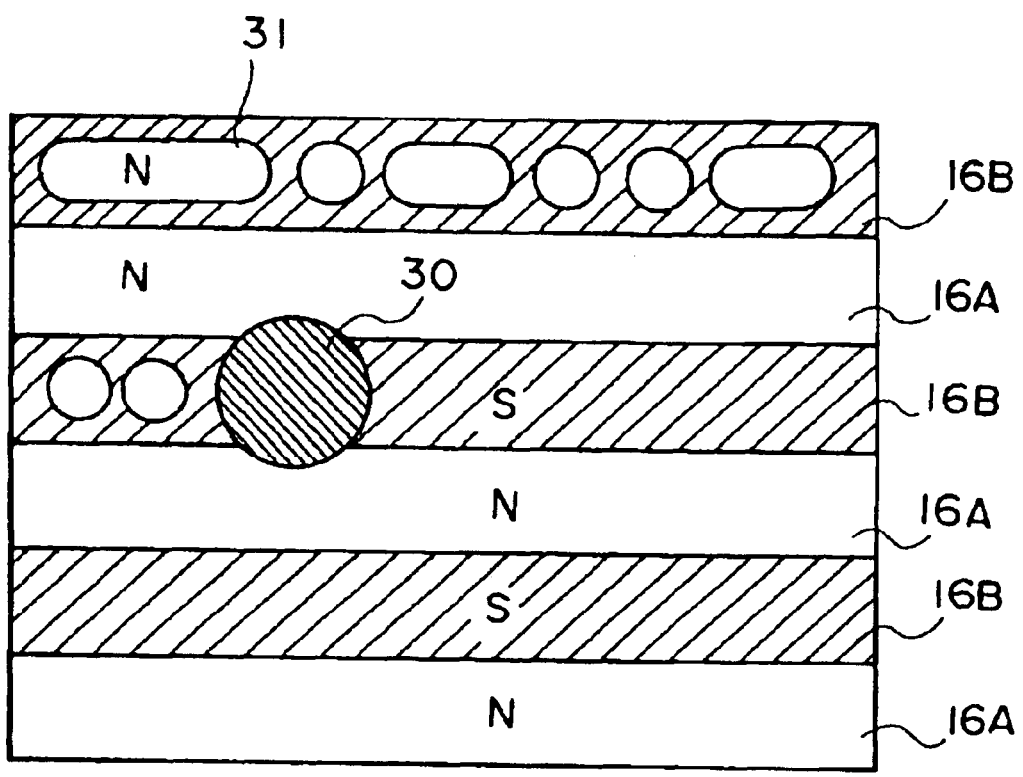
FIG. 4 is a plan view showing a recording pattern when information is recorded by a light modulation system.

In the first and second embodiments, there was described a case in which recording of information is carried out by a magnetic modulation system. However, as shown in FIG. 4, a magnetic field in which magnetic force acts in the direction opposite to that in which one of the magnetized region 16A and the magnetized region 16B is magnetized, is applied to the one of the magnetized regions, and magnetization of only a region irradiated with laser light 30 is reversed, thereby resulting in magnetic recording of information (light modulation system). At this time, the intensity distribution of laser light shows Gaussian distribution, and therefore, a recording signal 31 is formed at the center portion of a spot having a high intensity. For this reason, the recording signal 31 smaller than the spot of the laser light 30 is recorded in accordance with a recording signal. Further, as shown in FIG. 4, magnetized regions used for tracking and magnetized regions used for recording information are distinguished from each other in such a manner that, for example, information is recorded only in S type magnetized regions 16B and N type magnetized regions 16A are used for tracking. That is, information may be recorded in some of the magnetized regions.

In the above-described first and second embodiments, there was described a case in which the magnetic recording layer is in advance magnetized concentrically or spirally around the center of the disk for tracking, and tracking is continuously performed therefor. However, in addition to the magnetic recording layer being in advance magnetized concentrically or spirally around the center of the disk for tracking, servo fields can be in advance magnetically and discretely recorded in the magnetic recording layer.

Figure 11A:
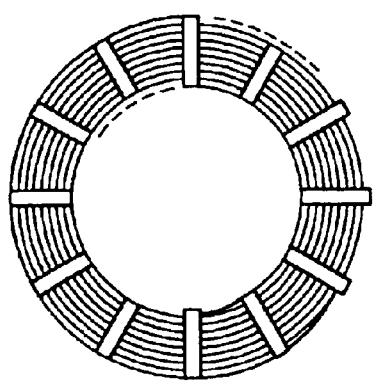
FIGS. 11A and 11B are diagrams showing a modified example in which servo information is discretely recorded on a magnetic recording layer.
Figure 11B:
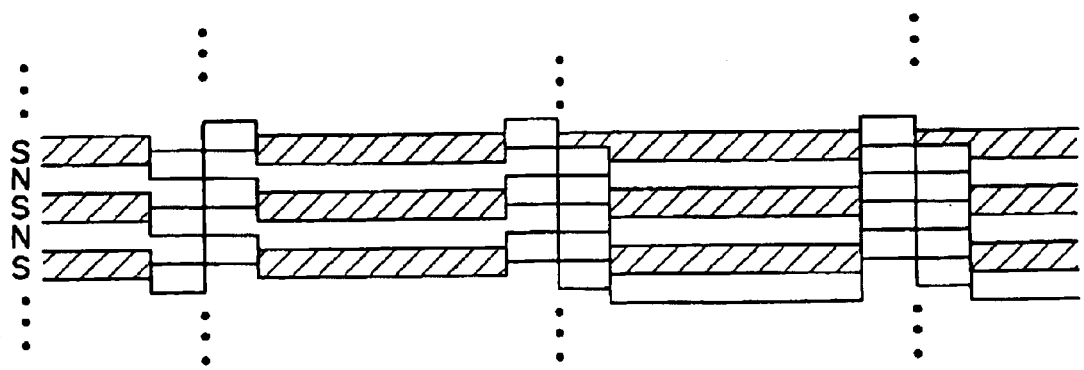

FIGS. 11A and 11B show an example in which servo fields are discretely disposed, and address information and tracking information are recorded in the servo fields. Further, apart from the servo fields, a concentric servo band for continuously performing tracking is also written.

As a result, by reading out the servo fields utilizing a magneto-optical effect such as Kerr effect, sector servo can be performed. Due to tracking servo and sector servo being used together, accurate tracking becomes possible and an access speed to a predetermined region becomes higher.

Figure 12A:
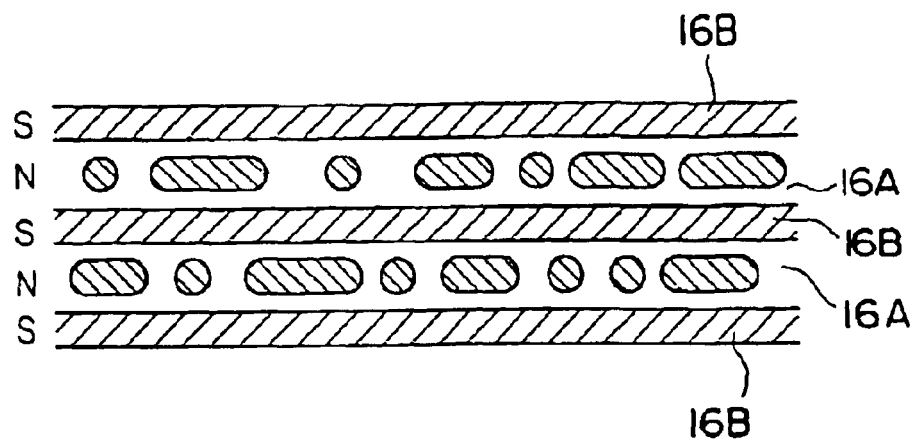
FIG. 12A is a partially enlarged plan view showing a magnetized state of the surface of a magnetic recording layer (light modulation recording) when the widthwise dimension of a recording magnetized region is made larger than that of a tracking magnetized region.
Figure 12B:
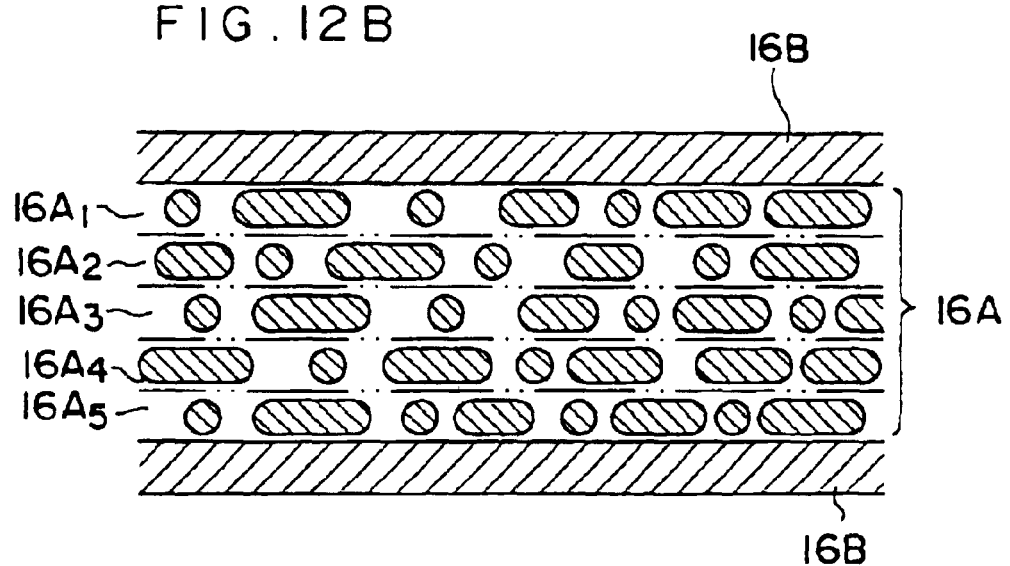
FIG. 12B is a partially enlarged plan view showing a magnetized state of the surface of the magnetic recording layer when a plurality of tracks exist in the recording magnetized region.

In the above-described first and second embodiments, the N type magnetized region 16A and the S type magnetized region 16B have substantially the same widthwise dimensions. However, when information is recorded only in the N type magnetized regions 16A and the S-type magnetized regions 16B are used for tracking, preferably, the widthwise dimension of the magnetized region 16B used for tracking is, as shown in FIG. 12A, made smaller than the widthwise dimension of the magnetized region 16A used for recording. Due to the widthwise dimension of the magnetized region 16A used for recording being made larger, format efficiency improves. For example, the widthwise dimension of the magnetized region 16B for tracking can be set so as to be 0.1 $\mu$m and the widthwise dimension of the magnetized region 16A for recording can be set so as to about 0.2 $\mu$m. Further, as shown in FIG. 12B, a plurality of tracks 16A$_1$ to 16A$_5$ are provided in the recording magnetized region 16A whose widthwise dimension is further made larger and writing can be carried out from a so-called multi-head having a plurality of magnetic heads in the tracks.

A super resolution layer for making a recording mark into a small size by super resolution, may be formed on the magnetic recording layer 16, and a dielectric protective layer or the like for enhancing a magneto-optical effect utilizing interference of light and preventing deterioration of a recording film may also be formed adjacently at both sides of the magnetic recording layer 16. Preferred examples of the dielectric protective layer include materials having a low degree of absorption for light used for recording and having a high refractive index, and silicon nitride, aluminum nitride, silicon oxide, zinc sulfide and mixtures thereof can be used.

Next, a description will be given of recording of information in the above-described magneto-optic disk 10 and reproduction of information from the magneto-optic disk 10. FIG. 13 schematically shows the structure of a magneto-optic disk recording and reproducing device which can be used for recording information in the magneto-optic disk 10 and for reproducing the recorded information.

As shown in FIG. 13, a magneto-optic head 100 (described later) provided with a magnetic head 50 and a photodetector (not shown) is disposed at the side of the magneto-optic disk 10 in which light is made incident (that is, at the side of the magnetic recording layer of the disk). The magneto-optic disk 10 is supported by a spindle motor 118 via magnet chucking or the like, and is made rotatable around the rotating shaft thereof.

A detection signal detected by the photodetector of the magneto-optic head 100 is divided into an information reproduction signal and a servo signal. The information reproduction signal is supplied from a first amplifier 102 to an A/D converter 104 of a reproduction signal processing system, and converted to a digital signal and further supplied to a digital equalizer 106 in which signal processing for the signal is carried out. Data obtained by the signal processing in the digital equalizer 106 is decoded by a decoder 108 and reproduced recording information is outputted. The servo signal is inputted to a second amplifier 110, and tracking error signal, rotation control signal, clock signal and the like are generated in the second amplifier 110.

The clock signal is supplied to a PLL circuit 112, and a clock signal serving as a reference signal (master clock) in a device, is supplied, by the PLL circuit 112, to the A/D converter 104, the digital equalizer 106, the head servo circuit 114, the spindle servo circuit 116 and the encoder 122.

The rotation control signal is inputted to the spindle servo circuit 116, and a motor driving circuit 120 is subjected to PLL control by the spindle servo circuit 116 to allow the spindle motor 118 to rotate at a predetermined rotational frequency.

The tracking error signal is inputted to the head servo circuit 114, and tracking servo is performed by the head servo circuit 114 so that a beam spot is positioned on a track, and the position of the magneto-optic head 100 in the radial direction of the disk is controlled. When recording and reproduction of information is carried out by using the magneto-optic disk 10, tracking servo is performed by utilizing magnetic Kerr effect, as will be described later.

Figure 3B:
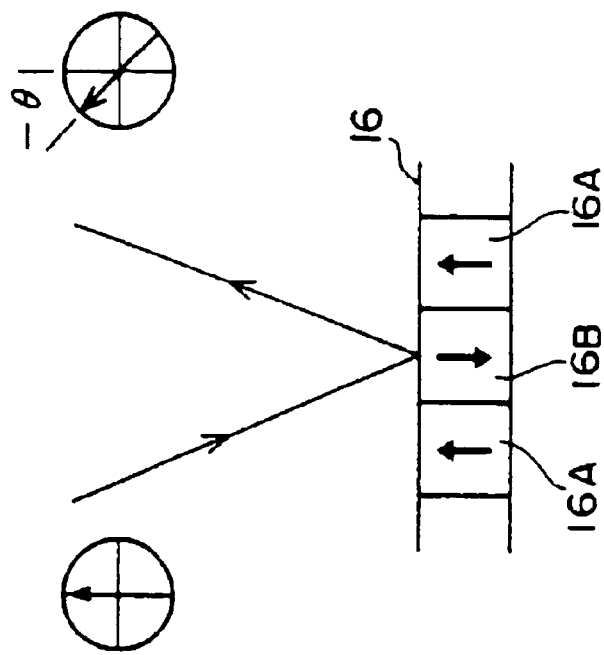
FIGS. 3A and 3B are diagrams for illustrating the tracking signal readout principle.
Figure 3A:
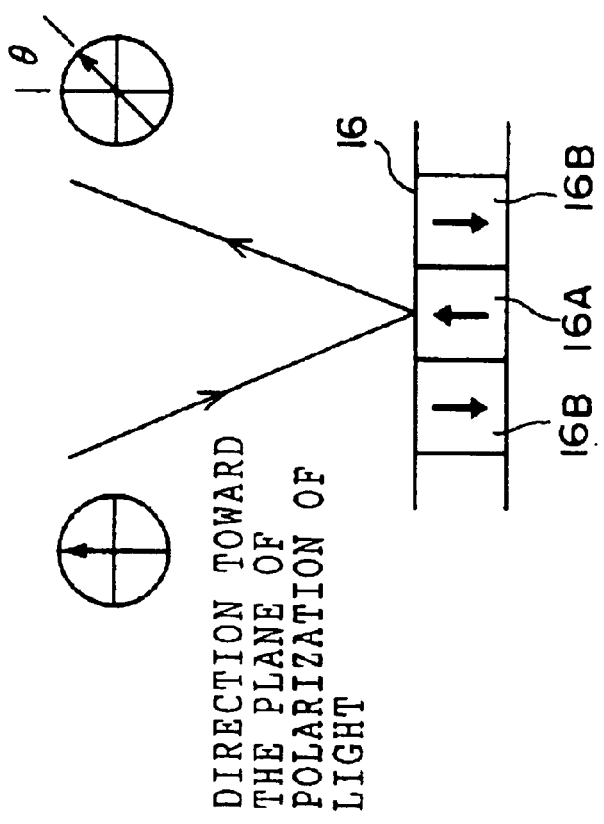

As shown in FIG. 3A, when the magnetized region 16A magnetized such that the surface thereof facing the substrate has a south pole and the recording surface thereof has a north pole is irradiated with linear polarized light, the plane of polarization of the reflected light rotates by a predetermined angle $\theta$ from the plane of polarization of incident light (for example, clockwise rotation) due to the magnetic Kerr effect. On the other hand, as shown in FIG. 3B, when the magnetized region 16B magnetized such that the surface thereof facing the substrate has a north pole and the recording surface thereof has a south pole is irradiated with the same linear polarized light, the plane of polarization of the reflected light rotates by a predetermined angle $-\theta$ from the plane of polarization of incident light (for example, counterclockwise rotation) due to the magnetic Kerr effect.

Accordingly, near field light applied as recording light is reflected by the magneto-optic disk 10, and tracking servo can be performed by detecting reflected light in which the plane of polarization is rotated therefrom by a predetermined angle through a polarizing plate or the like, and also detecting relative displacement between the head and the track based on the intensity of the reflected light. That is, the magnetized regions 16A and the magnetized regions 16B arranged concentrically or spirally function as a tracking guide.

As the tracking error detection system, tracking error detection systems used in the optical disk, for example, a push-pull method in which a tracking error signal is obtained using a two-piece photodetector, a three-beam method or the like can be used. Among these methods, a three-beam method in which the quality of a servo error signal to be generated becomes the highest is particularly preferable.

Figure 10:
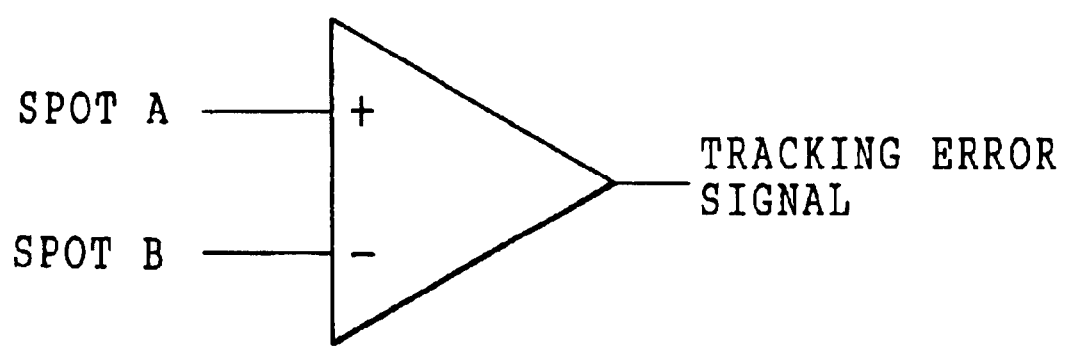
FIG. 10 is a diagram showing an input-output relationship of a circuit for outputting a tracking error signal.

A description will be hereinafter given of the three-beam method with reference to FIGS. 9A to 9E. The three-beam method is a method in which tracking is performed by dividing laser light generated from a laser light source, into a main beam used for recording and reproducing a signal and also into two sub-beams used for tracking. As shown in FIG. 9A, when a spot 100 formed by the main beam is directly disposed above the recording track, a spot A and a spot B formed by sub-beams are each made overlapping with one and the same track by the same degree, and the rotation angles of the planes of polarization of respective detected reflected light are substantially equal to each other. An output of the tracking error signal in the circuit shown in FIG. 10 becomes zero. On the other hand, as shown in FIGS. 9B and 9C, when the spot A and the spot B differs from each other in the degree at which the spot is made overlapping with one and the same track, an output of the tracking error signal in the circuit shown in FIG. 10 becomes a plus or minus output. Accordingly, displacement of the main beam from the center of recording track can be detected by the output of the tracking error signal.

FIGS. 9D and 9E are diagrams showing modified examples of beam arrangement. FIG. 9D shows an example in which arrangement of main beam and sub-beams is changed, and FIG. 9E shows an example in which a servo track read by sub-beams is separated from a recording track.

A recording signal (recording data) for recording information in the magneto-optic disk 10 is encoded by a clock signal in the encoder 122. The encoded signal is supplied to the magnetic head 50 connected to a system controller 126 via a record magnetic field control circuit 36, and is also supplied to an LD driving circuit 124 connected to the system controller 126. The LD driving circuit 124 supplies, based on an instruction from the system controller 126, laser light from a semiconductor laser (not shown) to the magneto-optic head 100.

Figure 5:
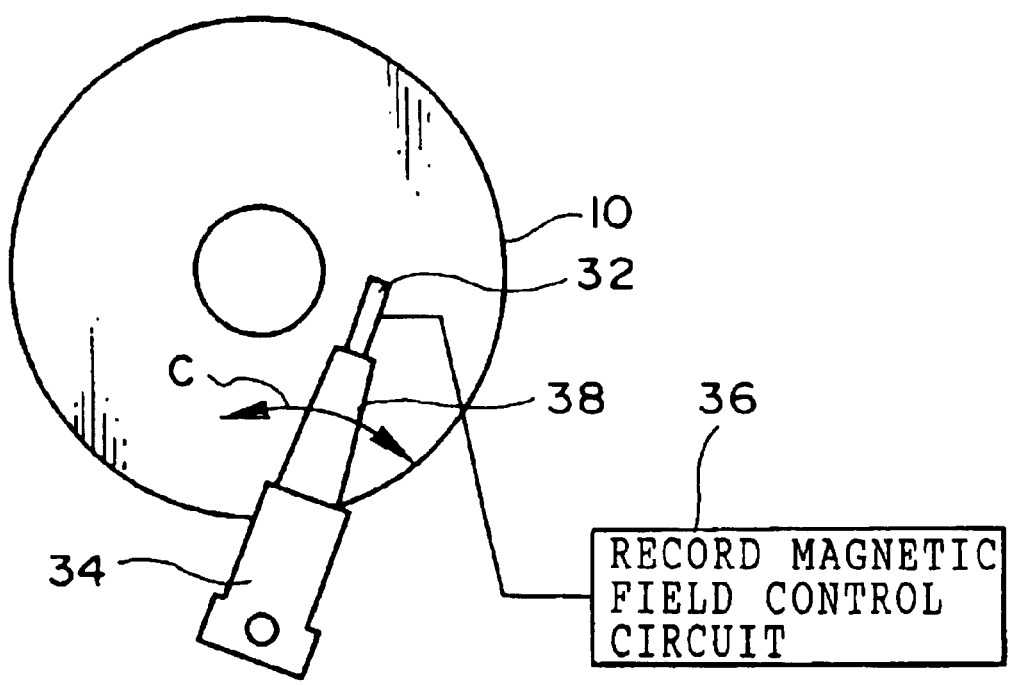
FIG. 5 is a plan view which schematically shows a recording and reproducing device used in recording and reproducing of information on the magneto-optic disk according to the embodiment of the present invention.

The magneto-optic head 100 of the recording and reproducing device includes, as shown in FIGS. 5 and 6, the floating slider 32 mounted at the end of a swing arm 34 and floating due to rotation of the magneto-optic disk 10. The floating slider 32 is mounted on a lower surface of a gimbal 52 which is a thin plate spring fixed at the end portion of a suspension 38, and the suspension 38 is supported by the swing arm 34. Further, the floating slider 32 is disposed above the recording surface of the magneto-optic disk 10 so that the floating surface (ABS: air bearing surface) 40 faces the recording surface of the magneto-optic disk 10, and is made movable in the radial direction of the magneto-optic disk 10 due to swinging movement of the swing arm 34 along the direction indicated by arrow C.

As shown in FIG. 6, the magneto-optic head 100 includes the floating slider 32 floating due to rotation of the magneto-optic disk 10, and the floating surface 40 is provided with a rail pattern 42 for feeding positive pressure or negative pressure. A micro-aperture 46 which is smaller than the wavelength of light is provided on the floating surface 40 of the floating slider 32. An optical fiber 44 is provided parallel to the suspension 38 so as to allow introduction of light from a semiconductor laser (not shown) disposed outside, into the micro-aperture 46. An emission end of the optical fiber 44 is disposed within the floating slider 32, and a condensing lens 47 for condensing light in the micro-aperture 46 is disposed below the emission end of the optical fiber 44. Further, the magnetic head 50 having an exciting coil is provided on the floating surface 40 so as to apply a magnetic field in which magnetic force acts in the direction perpendicular to the surface of the disk. The magnetic head 50 is connected to the record magnetic field control circuit 36 for controlling the magnetic field to be applied at the time of information recording. In this device, light introduced by the optical fiber 44 is condensed in the micro-aperture 46 by the condensing lens 47 and emitted from the micro-aperture 46 to thereby allow generation of near field light 54 in the vicinity of the micro-aperture 46.

When the magneto-optic disk 10 is rotated and the floating slider 32 is pressed against the magneto-optic disk 10, the magneto-optic disk 10 and the floating slider 32 stably slide in contact with each other with very weak force. Due to the stable contact-sliding state being thus set, the magnetic recording layer 16 of the magneto-optic disk 10 and the magnetic head 50 can be made close to each other so that the distance therebetween becomes 100 nm or less on an average of the disk surface. For the purpose of stable running of the head, the rotational frequency of the disk is preferably in the range from 1000 to 10000 rpm, and more preferably in the range from 2000 to 7500 rpm. Further, run out of the disk surface is preferably smaller, and more preferably about 50 $\mu$m or less.

When information is recorded by a magnetic modulation system, due to the magnetic recording layer 16 being irradiated with pulsed near field light in the above-described stable contact-sliding state, a portion irradiated with the light is heated to Curie temperature or higher and anti-magnetic force of the heated portion is sufficiently decreased. As a result, reversal of magnetization is apt to occur due to an even relatively small magnetic field strength. When a recording signal for recording information in the magneto-optic disk 10 is supplied to the encoder 122, magnetizing current of the magnetic head 50 for applying a magnetic field to the magneto-optic disk 10 is modulated by the record magnetic field control circuit 36 so as to be reversed in accordance with the recording signal. Due to the magnetic field modulated in accordance with the recording signal being applied to a region of the magnetic recording layer 16 in which reversal of magnetization is apt to occur, the magnetic field is reversed in the direction perpendicular to the disk surface. As shown in FIG. 7, recording pits 58 (a magnetic reversed portion) having the substantially same size as the portion heated by near field light 54 are formed along each of the magnetized region 16A and the magnetized region 16B, that is, tracks.

Further, when information is recorded by the magnetic modulation system, the pulse interval at which near field light is applied, is made smaller than the spot size of light beam for the purpose of increasing the recording density. As a result, as shown in FIG. 7, a recording pit formed formerly is partially made to overlap with a recording pit formed latterly, and recording pits are overwritten in the circumferential direction of the disk. As described above, in the magnetic modulation system, the size of the recording mark in the circumferential direction can be made smaller, which is further suitable for high density recording.

On the other hand, when information is recorded by a light modulation system, a magnetic field in which magnetic force acts in a direction opposite to the direction in which one of the magnetized region 16A and the magnetized region 16B is magnetized, is applied from the magnetic head 50 to the one of the magnetized regions. A semiconductor laser (not shown) is driven to be modulated by the LD driving circuit 125 so as to generate near field light whose intensity is modulated corresponding to the recording signal. The magnetic field in which magnetic force acts in the direction opposite to the direction in which the magnetized region is magnetized, is applied to the magnetized region. Therefore, due to the near field light whose intensity is modulated corresponding to the recording signal being applied to the magnetized region of the magnetic recording layer 16, only a portion irradiated with the light beam 30 is magnetically reversed. As shown in FIG. 4, the recording pit 31 is formed along each of the magnetized regions 16A and the magnetized regions 16B, that is, the tracks. At this time, the intensity distribution of light beam shows Gaussian distribution, and therefore, the recording pit 31 is formed at the center portion of a spot having a large intensity. Accordingly, a recording pit 31 smaller than the spot of the light beam 30 is recorded in accordance with the recording signal.

Further, as shown in FIG. 4, information may also be recorded in some of the magnetized regions in such a manner that magnetized regions used for tracking and magnetized regions used for recording information are distinguished from each other, for example, information is recorded only in S type magnetized regions 16B and N type magnetized regions 16A are used only for tracking. In the case of the magnetic modulation system as well, information may also be recorded in some of the magnetized regions.

At the time of reproducing information, in the same manner as in tracking servo in the stable contact-sliding state, the magnetized region on which the recording signal is recorded, is irradiated with near field light which is linearly polarized light, and the direction in which the plane of polarization of reflected light rotates corresponding to the difference in the direction in which the magnetized region is magnetized, is detected by utilizing magnetic Kerr effect, thereby allowing readout of the magnetically recorded recording signal. Further, reproduction of information may also be carried out by using a magnetic head, for example, magneto resistive (MR) head, giant magneto resistive (GMR) head, or tunnel magneto resistive (TMR) head, which heads each utilize a magneto-resistance effect in which electric resistance varies in accordance with the strength of a magnetic field. Among them, the GMR head and TMR head, having high sensitivity, are particularly preferable.

As described above, in the information recording medium used by the information recording method of the present invention, the magnetic recording layer is magnetized for tracking in such a manner that magnetized regions which are in advance magnetized in different directions are alternately arranged in the radial direction. Therefore, tracking can be performed based on the difference in the directions in which the magnetized regions are magnetized. Since tracking can be thus performed based on the difference in the directions in which the magnetized regions are magnetized, it is not necessary to form unevenness on the surface of the medium, and even when the detector is disposed extremely in the vicinity of the recording medium, stable running or flying state of the head can be realized.

Further, the magnetic recording layer is in advance magnetized for tracking concentrically or spirally around the center of the disk. Therefore, tracking can be continuously performed and accurate tracking servo can be performed, and further, recording and reproducing of a signal can be carried out at a favorable S/N. Moreover, information is recorded in the magnetized region in a state of being in advance magnetized, and therefore, it is possible to prevent reduction in the recording capacity caused by increase in the area of the servo region. Particularly, due to the directions in which the magnetized regions are magnetized being made perpendicular to the surface of the disk, there is no possibility that the magnetized regions, which are disposed such that adjacent regions are magnetized in different directions and alternately arranged in the radial direction of the disk, may weaken magnetic force one another. As a result, the magnetic force of each magnetized region is stabilized.

In addition, tracking can be performed based on the difference in the directions in which the magnetized regions are magnetized. Therefore, it is not necessary to form unevenness on a disk-shaped smooth base plate. Even when the detector is disposed extremely in the vicinity of the recording medium as in the next-generation high density recording system utilizing near field light, stable running or flying state of the head can be realized. Further, the magneto-optic disk has, as the base material, the substrate such as a resin film having flexibility. Therefore, head crash at the time of coming in contact with the magnetic head can be avoided, and the magneto-optic disk and the magnetic head stably slide in contact with each other with very weak force. Moreover, when the resin film having flexibility, or the like is used as the base material, the magneto-optic disk can be manufactured at a low cost.

In the information recording method of the present invention, information is magnetically recorded, by using the information recording medium, in the magnetized region magnetized in advance for tracking. Therefore, reduction in the recording capacity caused by an increase in the area of the servo region can be prevented. Further, the portion irradiated with near field light is heated to the Curie temperature or thereabouts, and information is magnetically recorded by applying a magnetic field of a predetermined direction from the magnetic head. Therefore, a recording mark smaller than that formed by normal light recording can be formed, and high density recording can be carried out. Moreover, tracking is continuously performed as described above, thereby allowing accurate tracking servo. Accordingly, recording of a signal can be carried out at a favorable S/N.

Moreover, information is recorded by applying a magnetic field perpendicular to the surface of the disk (that is, vertical magnetization). Therefore, adjacent recording pits are magnetized in different directions, and there is no possibility that the recording pits may weaken magnetic force each other. As a result, the magnetic force of the recording region becomes stable.

Still further, near field light exists only in a region between the emission end and the wavelength of the light. Therefore, recording needs to be carried out with the detector being disposed extremely in the vicinity of the recording medium. However, when information is recorded in the magnetic recording layer at the side at which no base plate is provided (so-called first surface recording), the magnetic recording layer can be disposed closer to the detector than a case in which information is recorded on the magnetic recording layer via the thick base plate.

In the foregoing, there was described a case in which the magneto-optic disk accommodated in the cartridge is used as a commutative medium. However, the information recording medium of the present invention can also be applied to a hard disk.

Further, in the above-described embodiments, the magnetic head is provided at the side of the magnetic layer, but in the case of light modulation recording, the magnetic head may also be disposed at the back side of the disk.

Next, a description will be given of an information recording medium manufactured by the manufacturing method of the present invention. The information recording medium 10 is, as described in the first embodiment (see FIG. 1A), a disk shaped information recording medium having a center hole at the center thereof. Further, the information recording medium 10 may also be a hard disk as described in the second embodiment.

When the information recording medium is a flexible disk, the substrate 14 is, as in the first embodiment, comprised of a resin film having flexibility for the purpose of avoiding head shock at the time of coming in contact with the head.

When the information recording medium 10 is a hard disk, the substrate 14 is, as in the second embodiment, comprised of material having a relatively high hardness, for example, aluminum base plate, glass base plate, polycarbonate base plate or carbon base plate. The thickness of such base plate is preferably in the range from 0.2 to 2.0 mm, and more preferably in the range from 0.3 to 1.2 mm.

Next, a description will be given of the manufacturing method of the present invention in which an information recording medium is manufactured by preformatting the magnetic recording layer 16 of the above-described information recording medium. As shown in FIGS. 2A to 2C, magnetic transfer is a method in which a magnetized region of a predetermined pattern is formed by magnetically transferring from the master carrier 24 including a base plate 26, which is comprised of non-magnetic material and has an uneven pattern formed thereon, and a magnetic layer 28 comprised of a ferromagnetic material and formed on the base plate 26, to the slave medium 22 having a non-magnetized magnetic recording layer 16. The method for forming the magnetized region by magnetic transfer will be specifically described hereinafter.

As shown in FIG. 2A, first, a direct current magnetic field in which magnetic force acts in the direction indicated by arrow A is applied to the slave medium 22 in which the magnetized magnetic recording layer 16 in the state of being not magnetized, a protective layer (not shown), and a lubricating layer (not shown) are formed on the substrate 14 in layers, and the magnetic recording layer 16 of the slave medium 22 is excited in the direction indicated by arrow A (initial magnetization). The magnetic recording layer 16 is subjected to initial magnetization so as to entirely become a magnetized region 16A.

Next, as shown in FIG. 2B, with the master carrier 24 being made in closely contact with the initially magnetized slave medium 22, a direct current magnetic field or an alternate current bias magnetic field, flowing in the direction indicated by arrow B, is applied, as the transfer magnetic field, to the slave medium. As a result, as shown in FIG. 2C, the magnetic field indicated by arrow B is applied to corresponding portions of the magnetic recording layer 16 from a portion in which the slave medium 22 and the magnetic layer 28 contact each other. The magnetization of the corresponding portions is reversed and magnetized regions 16B are formed in the magnetized region 16A. As a result, precision preformatting of the slave medium 22 can be performed.

As the base plate 26 of the master carrier 24, a patterned base plate produced by stamper manufacturing technique, which will be described later, is preferably used. When the base plate is produced by stamper manufacturing technique, the base plate 26 may be made of nickel, magnetic metal containing nickel as the main component, or nonmagnetic material. Further, a base plate made of synthetic resin may also be produced by injection molding using a die formed of metal material containing nickel. When the base plate made of synthetic resin is produced by injection molding, it is preferable that the surface thereof may be smoothened due to burr being removed by varnish treatment or polish treatment.

Further, when the base plate 26 is produced by a photofabrication method used in a semiconductor production process, as the base plate 26, a plate-shaped member having a smooth surface and comprised of non-magnetic metal or alloy such as silicon, quartz plate, glass or aluminum, ceramics, synthetic resin or the like is used, which plate-shaped member has a resistance to a processing environment such as the temperature in an etching process or a film forming process, which will be described later.

A non-magnetic substrate layer is preferably provided on the surface of the base plate 26 for the purpose of forming magnetic anisotropy in the magnetic layer 28. When the substrate layer is provided, it is necessary that the crystal structure and lattice constant of the substrate layer be the same as those of the magnetic layer. Examples of material of the substrate layer include Cr, CrTi, CoCr, CrTa, CrMo, NiAl and Ru. The substrate layer can be formed by forming a film from such material using sputtering.

A ferromagnetic material having a large magnetic flux density, for example, cobalt, iron, nickel or alloys thereof can be used for the magnetic layer 28. Specific examples of the material include Co, CoNiZr, CoNbTaZr, Fe, FeCo, FeCoNi, FeNiMo, FeAlSi, FeAl, FeTaN, Ni and NiFe. Among them, FeCo and FeCoNi are particularly preferable. The thickness of the magnetic layer 28 is in the range from 20 to 1000 nm, and preferably in the range from 30 to 500 nm. If the thickness is too large, recording resolution deteriorates.

The material used for the magnetic layer 28 preferably has a large magnetic flux density and the same magnetic anisotropy as the slave medium, for example, in the case of horizontal magnetization, horizontal magnetic anisotropy is shown, and in the case of vertical magnetization, vertical magnetic anisotropy is shown. The material used for the magnetic layer 28 preferably has fine magnetic grains or an amorphous structure.

A protective film is preferably formed on the surface of the magnetic layer 28 for the purpose of alleviating damage to the magnetic layer, for example, cutting caused by friction. The protective film may also be formed in such a manner that a carbon protective film having a graphite structure or a diamond-like structure is subjected to plasma CVD with carbon containing compound, for example, alkane such as methane, ethane, propane or butane, alkene such as ethylene or propylene, or alkyne such as acetylene, being used as raw material. In this case, desirably, a negative voltage of 50 to 400 V is applied to the base plate. It is preferable that the thickness of the carbon protective film is in the range from 5 to 30 nm. Further, it is more preferable that a lubricating agent is added to the carbon protective film. When the lubricating agent is added, it is possible to prevent deterioration of durability caused by friction when the master carrier and the slave medium contact each other.

Further, in order that the master carrier and the slave medium be made closely in contact with each other, a method is preferable, wherein they are pressurized from the non-magnetic member such as an aluminum plate via a rubber plate. Particularly, it is effective to use a method in which air interposed between the master carrier and the slave medium overlapping with each other, is drawn in by suction in under reduced pressure. The positional relationship between the master carrier and the slave medium at the time of transfer may be set such that one of the two may be disposed at the upper side and the other may be disposed at the lower side.

The master carrier 24 can be produced by photofabrication using a resist mask, or stamper manufacturing technique used in formation of the base plate of an optical disk. Referring now to the attached drawings, an example of a method for producing the master carrier 24 using the stamper manufacturing technique will be specifically described hereinafter.

Figure 14A:
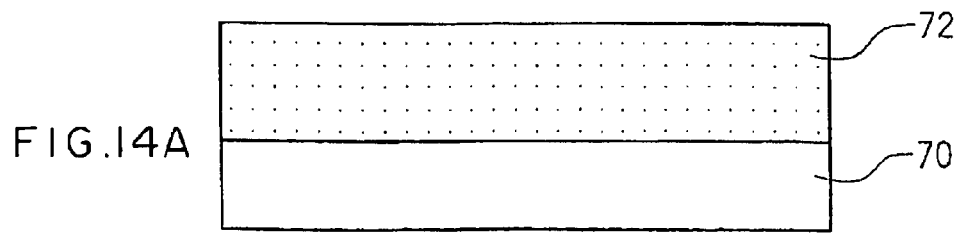
FIGS. 14A to 14E are cross sectional views for sequentially illustrating a manufacturing process of a master carrier.
Figure 14B:
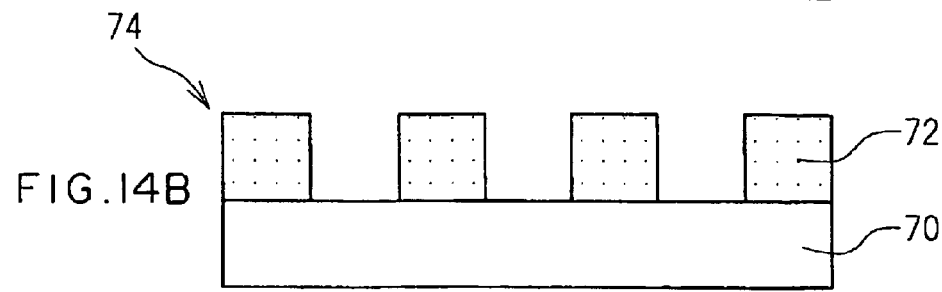
Figure 15:
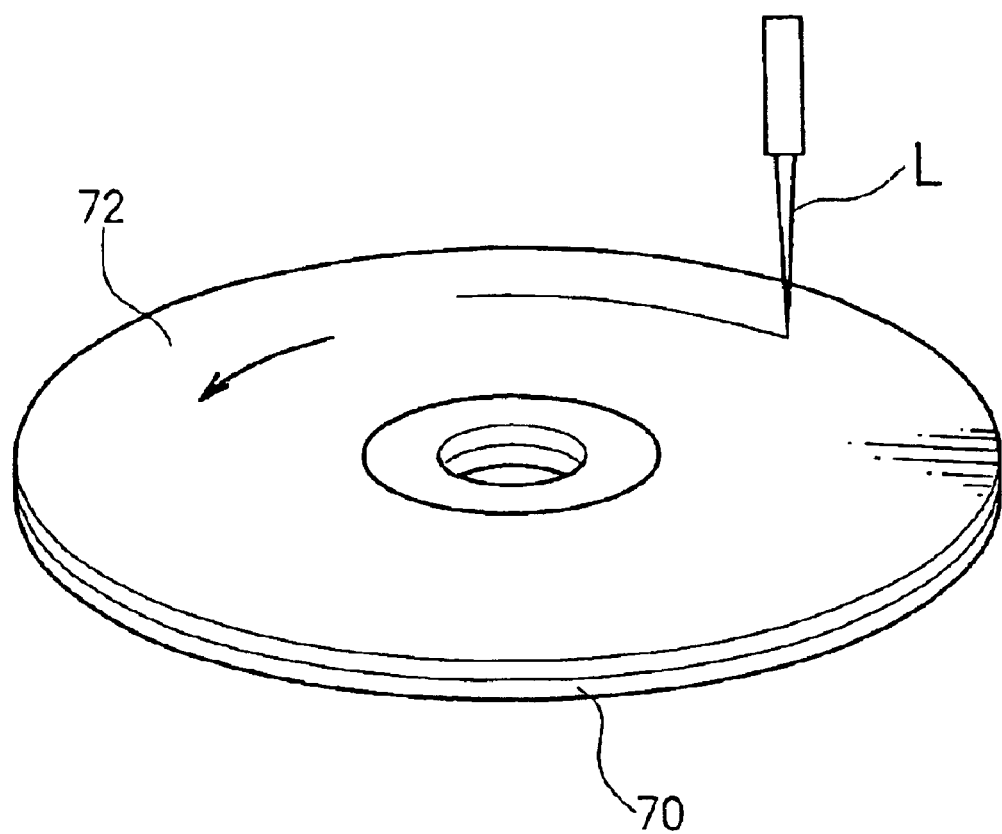
FIG. 15 is a perspective view for illustrating a portion of the manufacturing process of a master carrier.

First, as shown in FIG. 14A, a photoresist 72 is applied by spin coating onto a stamper-manufacturing disk 70 having a smooth surface. The photoresist 72 may be either positive type resist or negative type resist. As shown in FIG. 15, the photoresist 72 formed on the stamper-manufacturing disk 70 is irradiated with light beam L (for example, laser light) modulated in accordance with preformat information while the disk is being rotated, thereby allowing exposure of the photoresist 72 to the light beam. When the exposed photoresist 72 is developed, as shown in FIG. 14B, an original plate 74 with an unevenness pattern corresponding to the preformat information formed thereon, is obtained. That is, the original plate 74 has the unevenness pattern formed thereon, which corresponds to one of the magnetized region 16A and the magnetized region 16B formed concentrically or spirally around the center of the disk as shown in FIGS. 1A to 1C.

Figure 14C:
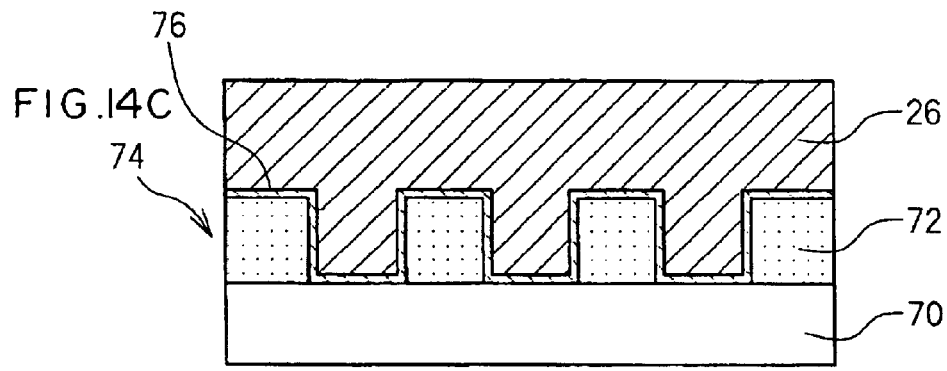
Figure 14D:
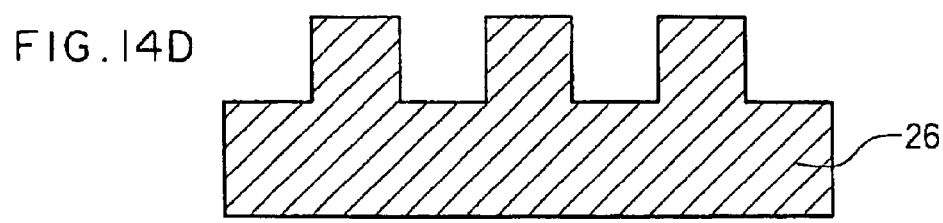

As shown in FIG. 14C, a thin silver-plated layer 76 is formed on the surface of the original plate 74, and thereafter, the original plate 74 is used as a mother die, and a metal plate having a predetermined thickness is formed by electrocasting using nickel or the like as deposit metal. When the metal plate is removed from the original plate 74, the base plate 26 of the master carrier 24 is obtained as shown in FIG. 14D. The unevenness pattern of the original plate 74 is reverse-transferred to the surface of the base plate 26.

Figure 14E:
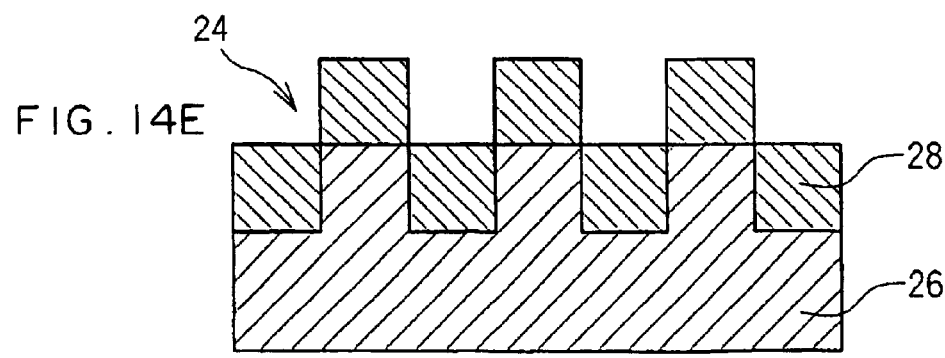

As shown in FIG. 14E, the magnetic layer 28 formed as a film made of magnetic material by sputtering, vacuum deposition, plating or the like is provided on the entire surface of the base plate 26 having the unevenness pattern formed thereon, and the master carrier 24 is thereby completed.

As described above, the manufacturing method of an information recording medium according to the present invention is provided in such a manner that the magnetic recording layer is entirely magnetized in a predetermined direction, and the magnetic layer of the disk-shaped master carrier formed concentrically or spirally around the center of the disk is made in close contact with the magnetic recording layer of the information recording medium, and a magnetic field in which magnetic force acts in the direction different from the predetermined direction is applied to the magnetic recording layer via the magnetic layer to reverse the direction in which the portion of the magnetic recording layer with which the magnetic layer is made in close contact is magnetized, thereby allowing production of the information recording medium. That is, a large amount of information can be transferred together only by applying the magnetic field to the magnetic recording layer via the magnetic layer of the master carrier, and preformat-recording can be achieved in an extremely short time. As a result, excellent productivity is obtained.

Further, static recording can be carried out without changing the relative positions of the master carrier and the information recording medium. Therefore, precision preformat-recording can be carried out.

Moreover, since a ferromagnet pattern is magnetically excited, a magnetic flux converges at an end of the pattern, and magnetic field strength higher than or equal to the magnetic field to be applied is realized. Additionally, the magnitude of the magnetic field can be adjusted by a magnetic field to be applied externally, and is not much influenced by anti-magnetic force of the recording medium itself.

In the information recording medium manufactured by the above-described manufacturing method, the magnetic recording layer is magnetized for tracking such that magnetized regions magnetized in advance in different directions are alternately arranged in the radial direction of the disk. Therefore, based on the difference in the directions in which the magnetized regions are magnetized, tracking can be performed. Tracking is thus performed based on the difference in the directions in which the magnetized regions are magnetized, and therefore, it is not necessary to form unevenness on the surface of the medium. Even when the detector is disposed extremely in the vicinity of the recording medium, stable running or flying state of the head can be realized.

Further, the magnetic recording layer is in advance magnetized for tracking concentrically or spirally around the center of the disk, and therefore, tracking can be continuously performed, and accurate tracking servo can be performed, thereby resulting in recording and reproducing of a signal at a favorable S/N. Moreover, information is recorded in the magnetized region previously magnetized for tracking. Therefore, it is possible to prevent reduction in the recording capacity caused by an increase in the area of the servo region. Particularly, due to the magnetized region being magnetized in the direction perpendicular to the surface of the disk, there is no possibility that the magnetized regions, which are disposed such that adjacent regions are magnetized in different directions and alternately arranged in the radial direction of the disk, may weaken magnetic force one another. As a result, the magnetic force of each magnetized region becomes stable.

Moreover, tracking can be performed based on the difference in the directions in which the magnetized regions are magnetized. Therefore, it is not necessary to form unevenness on the disk-shaped smooth base plate. Even when the detector is disposed extremely in the vicinity of the recording medium as in the next-generation high density recording system utilizing near field light, stable running or flying state of the head can be realized.

The information recording medium of the present invention has an effect in that tracking servo can be accurately performed. Further, the method for recording and reproducing for an information recording medium according to the present invention has an effect in that by carrying out at least one of image recording and image reproduction while accurately carrying out tracking servo, recording and reproducing of a signal can be carried out at a favorable S/N.

Further, the information recording medium of the present invention has an effect in that tracking servo can be accurately performed, and even when the detector is disposed extremely in the vicinity of the recording medium, stable running or flying state of the head becomes possible.

Moreover, the manufacturing method of an information recording medium according to the present invention has an effect in that an information recording medium which allows accurate tracking servo can be manufactured precisely in a short time.

What is claimed is:

1. An information recording disk-shaped medium comprising a substrate with a magnetic recording layer disposed thereon for magnetically recording information, wherein the magnetic recording layer is in advance magnetized concentrically or spirally around a center of the substrate for tracking and is disposed in such a manner that magnetized regions magnetized in different directions are alternately arranged in a radial direction of the substrate.

2. An information recording medium according to claim 1, wherein the directions in which the magnetized regions are magnetized for tracking are perpendicular to a surface of the substrate.

3. An information recording medium according to claim 1, wherein the substrate is disk-shaped, flexible and non-magnetic.

4. An information recording medium according to claim 1, wherein discrete servo fields are in advance magnetically recorded in the magnetic recording layer.

5. An information recording medium according to claim 1, wherein the magnetized regions are each formed so as to meander at a fixed frequency.

6. An information recording medium according to claim 1, wherein a magnetized region magnetized in a predetermined direction is wider than a magnetized region magnetized in a direction which is different from the predetermined direction.

7. A method for recording and reproducing for an information recording disk-shaped medium, in which the information recording medium comprises a substrate with a magnetic recording layer disposed thereon for magnetically recording information, the magnetic recording layer being in advance magnetized concentrically or spirally around a center of the substrate for tracking and being disposed in such a manner that magnetized regions magnetized in different directions are alternately arranged in a radial direction of the substrate, is used, comprising:
at least one of recording and reproducing information, while performing tracking based on a difference in the directions in which the magnetized regions of the magnetic recording layer are magnetized.

8. A method for recording and reproducing for an information recording medium according to claim 7, wherein the magnetized regions are irradiated with linearly polarized light, a direction in which the plane of polarization of reflected light rotates corresponding to the difference in the directions in which the magnetized regions are magnetized is detected, and the tracking is preformed based on the detected direction in which the plane of polarization of the reflected light rotates.

9. A method for recording and reproducing for an information recording medium according to claim 8, wherein the linearly polarized light is near field light.

10. A method for recording and reproducing for an information recording medium according to claim 7, wherein the tracking is performed by using a three-beam method in which directions in which the planes of polarization of reflected lights of two tracking beams rotate are detected respectively and the two detected values are compared.

11. A method for recording and reproducing for an information recording disk-shaped medium, in which the information recording medium comprises a substrate with a magnetic recording layer disposed thereon for magnetically recording information, the magnetic recording layer being in advance magnetized concentrically or spirally around a center of the substrate for tracking and being disposed in such a manner that magnetized regions magnetized in different directions are alternately arranged in a radial direction of the substrate, and discrete servo fields being in advance magnetically recorded in the magnetic recording layer, is used, comprising:
at least one of recording and reproducing information, while performing tracking based on a difference in the directions in which the magnetized regions of the magnetic recording layer are magnetized; and
performing sector servo based on the discretely recorded servo fields.

12. A method for recording and reproducing for an information recording disk-shaped medium, in which the information recording medium comprises a substrate with a magnetic recording layer disposed thereon for magnetically recording information, the magnetic recording layer being in advance magnetized concentrically or spirally around a center of the substrate for tracking and being disposed in such a maimer that magnetized regions magnetized in different directions are alternately arranged in a radial direction of the substrate, and the magnetized regions being each formed so as to meander at a fixed frequency, is used, comprising:
at least one of recording and reproducing information, while performing tracking based on a difference in the directions in which the magnetized regions of the magnetic recording layer are magnetized; and
generating at least one of a clock signal and an address signal based on the frequency at which the magnetized regions meander.

13. A method for recording and reproducing for an information recording medium according to claim 7, wherein information is recorded in the magnetized regions.

14. A method for recording and reproducing for an information recording medium according to claim 7, wherein information is recorded in the magnetized regions by using one of a light modulation system or a magnetic modulation system.

15. A method for recording and reproducing for an information recording medium according to claim 7, wherein information is magnetically recorded in such a manner in which the magnetized regions of the magnetic recording layer are irradiated with near field light and a portion irradiated with the near field light is heated to a substantial Curie temperature, and a magnetic field having a predetermined direction thereof is applied to the portion from a magnetic head.

16. A method for recording and reproducing for an information recording medium according to claim 7, wherein information is magnetically recorded only in a magnetized region magnetized in a predetermined direction.

17. A method for recording and reproducing for an information recording medium according to claim 16, wherein the magnetized region magnetized in the predetermined direction is wider than a magnetized region magnetized in a direction which is different from the predetermined direction.

18. A method for recording and reproducing for an information recording medium according to claim 16, wherein the magnetized region magnetized in the predetermined direction is divided into a plurality of tracks and information is recorded thereon.

19. A method for recording and reproducing for an information recording medium according to claim 10, wherein the magnetized regions are irradiated with linearly polarized light, a direction in which the plane of polarization of reflected light rotates corresponding to the difference in the directions in which the magnetized regions are magnetized is detected, and information recorded in the magnetized regions is read based on the detected direction in which the plane of polarization of the reflected light rotates.

20. A method for recording and reproducing for an information recording medium according to claim 7, wherein electric current is made to generate due to magnetism of the magnetized regions by electromagnetic induction, a direction in which the electric current flows corresponding to the difference in the directions in which the magnetized regions are magnetized is detected, and information recorded in the magnetized regions is reproduced based on the detected direction in which the electric current flows.

21. A method for recording and reproducing for an information recording medium according to claim 7, wherein electrical resistance is made to change due to magnetism of the magnetized regions, and a changed amount of the electrical resistance is detected, and information recorded in the magnetized region is reproduced based on the detected changed amount of the electrical resistance.

22. A method for recording and reproducing for an information recording medium according to claim 7, wherein at least one of recording and reproducing of information is carried out in such a manner that the surface of the magnetic recording layer and the magnetic head are made close to each other with a distance therebetween of no greater than 100 nm on a substrate-surface average.

23. An information recording medium according to claim 1, wherein the substrate is disk-shaped and smooth.

24. An information recording medium according to claim 23, wherein a direction of magnetization for tracking and a direction of magnetization for recording and reproducing information are each made perpendicular to the surface of the disk.

25. An information recording medium according to claim 23, wherein a protective layer is formed on the magnetic recording layer.

26. An information recording medium according to claim 25, wherein a lubricating film is formed on the protective layer.

27. An information recording medium according to claim 26, wherein a total thickness of the protective layer and the lubricating film is no greater than 100 nm.

28. An information recording medium according to claim 23, wherein a reflective film is formed between the substrate and the magnetic recording layer.

29. An information recording medium according to claim 23, wherein the substrate is a flexible and non-magnetic base plate.

30. A method for recording and reproducing for an information recording medium according to claim 7, wherein information is magnetically recorded in such a manner in which the magnetized regions of the magnetic recording layer are irradiated with near field light and a portion irradiated with the near field light is heated to a substantially Curie temperature, and a magnetic field having a predetermined direction thereof is applied to the portion from a magnetic head.

31. A method for recording and reproducing for an information recording medium according to claim 30, wherein the predetermined direction of the magnetic field is perpendicular to the surface of the substrate.

32. A method for recording and reproducing for an information recording medium according to claim 30, wherein information is recorded in the magnetic recording layer by applying the magnetic field having the predetermined direction thereof, from a side of the magnetic recording layer opposite to the substrate.

33. A method for recording and reproducing for an information recording medium according to claim 30, wherein, with the magnetic field having the predetermined direction thereof being applied from the magnetic head to the magnetized regions of the magnetic recording layer, the near field light modulated in accordance with a recording signal is applied to the magnetized regions to thereby allow magnetic recording of information.

34. A method for recording and reproducing for an information recording medium according to claim 30, wherein, with near field light being applied to the magnetized regions of the magnetic recording layer, the magnetic field having the predetermined direction thereof, which is modulated in accordance with a recording signal, is applied to the magnetized regions Thorn the magnetic head to thereby allow magnetic recording of information.

35. A method for recording and reproducing for an information recording medium according to claim 30, wherein the substrate is flexible and non-magnetic.

36. A method for recording and reproducing for an information recording medium according to claim 30, wherein information is recorded in such a manner that the surface of the magnetic recording layer and the magnetic head are moved close to each other with a distance therebetween of no greater than 100 nm.

37. A method for recording and reproducing for an information recording medium according to claim 30, wherein the tracking is performed in such a manner that a reflective film is formed between the substrate and the magnetic recording layer, and light reflected by the surface of the magnetic recording layer when near field light is applied to the information recording medium and light transmitted through the magnetic recording layer and reflected by the reflective film are detected.

38. A method for recording and reproducing for an information recording medium according to claim 30, wherein information is recorded by dividing a magnetized region magnetized in the predetermined direction into a plurality of tracks.

39. A method of manufacturing an information recording disk-shaped medium, the information recording medium comprising a substrate with a magnetic recording layer disposed thereon for magnetically recording information, the magnetic recording layer being in advance magnetized concentrically or spirally around the center of the substrate for tracking such that magnetized regions magnetized in different directions are alternately arranged in a radial direction of the substrate, said method comprising the steps of:

magnetizing the entire magnetic recording layer in a predetermined direction;

adhering a magnetic layer of a substrate-shaped master carrier to a surface of the magnetic recording layer of the information recording medium, the master carrier being formed concentrically or spirally around a center of the substrate and having an unevenness pattern in which at least convex portions are covered by the magnetic layer; and applying a magnetic field having a direction thereof which is different from the predetermined direction, to the magnetic recording layer via the magnetic layer to thereby reverse a magnetized direction of a portion of the magnetic recording layer to which the magnetic layer adheres.

* * * * *